US012719138B2

(12) United States Patent
Tsukamoto et al.

(10) Patent No.: US 12,719,138 B2
(45) Date of Patent: Aug. 25, 2026

(54) MANUFACTURING METHOD OF ELECTRODE PLATE, MANUFACTURING METHOD OF SECONDARY BATTERY, ELECTRODE PLATE, AND SECONDARY BATTERY

(71) Applicant: Prime Planet Energy & Solutions, Inc., Tokyo (JP)

(72) Inventors: Kentaro Tsukamoto, Kobe (JP); Kyogo Sumi, Kobe (JP); Yoshifumi Magari, Hirakata (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 789 days.

(21) Appl. No.: 18/087,820

(22) Filed: Dec. 23, 2022

(65) Prior Publication Data

US 2023/0207981 A1 Jun. 29, 2023

(30) Foreign Application Priority Data

Dec. 27, 2021 (JP) ................................ 2021-213044

(51) Int. Cl.
*H01M 50/533* (2021.01)
*H01M 50/538* (2021.01)

(52) U.S. Cl.
CPC ....... *H01M 50/533* (2021.01); *H01M 50/538* (2021.01)

(58) Field of Classification Search
CPC .......................... H01M 50/533; H01M 50/538
USPC ........................................................ 429/211
See application file for complete search history.

(56) References Cited

U.S. PATENT DOCUMENTS

| | | | | |
|---|---|---|---|---|
| 2014/0017564 | A1* | 1/2014 | Suzuki | H01M 4/133 428/606 |
| 2016/0036009 | A1 | 2/2016 | Cho et al. | |
| 2019/0198853 | A1 | 6/2019 | Nishio et al. | |
| 2022/0109147 | A1* | 4/2022 | Tamura | H01M 4/463 |

FOREIGN PATENT DOCUMENTS

| | | |
|---|---|---|
| JP | 2018037308 A | 3/2018 |
| JP | 6727990 B2 | 7/2020 |

* cited by examiner

*Primary Examiner* — Anca Eoff
*Assistant Examiner* — Omar M Kekia
(74) *Attorney, Agent, or Firm* — HAUPTMAN HAM, LLP

(57) ABSTRACT

The herein disclosed manufacturing method of the electrode plate includes a core body exposed area cutting step for cutting a negative electrode core body exposed area with a laser, on which a negative electrode core body is exposed while a negative electrode active material layer is not provided, so as to form a negative electrode tab. Then, regarding the herein disclosed manufacturing method of the electrode plate, the negative electrode core body includes a first surface and a second surface whose surface roughness is smaller than the first surface, and the laser is irradiated to the first surface. By doing this, it is possible to suppress the sputters from sticking to the second surface, and therefore it is possible to decrease the sticking number of the sputters to the negative electrode tab.

10 Claims, 10 Drawing Sheets

MANUFACTURING METHOD OF ELECTRODE PLATE, MANUFACTURING METHOD OF SECONDARY BATTERY, ELECTRODE PLATE, AND SECONDARY BATTERY

CROSS REFERENCE TO RELATED APPLICATIONS

The present application claims the priority based on Japanese Patent Application No. 2021-213044 filed on Dec. 27, 2021, the entire contents of which are incorporated in the present specification by reference.

BACKGROUND

1. Technical Field

The present disclosure relates to a manufacturing method of an electrode plate, a manufacturing method of a secondary battery, an electrode plate, and a secondary battery.

2. Description of the Related Art

A secondary battery, such as a lithium ion secondary battery, includes, for example, an electrode body in which a positive electrode plate and a negative electrode plate are opposed via a separator. Below, these positive electrode plate and negative electrode plate are together referred to as "electrode plate". This electrode plate includes, for example, an electrode core body being a metal foil, and includes an electrode active material layer disposed on a surface of the electrode core body. In a manufacture of the electrode plate configured as described above, at first, the electrode active material layer is disposed on a large electrode core body. By doing this, a precursor of the electrode plate (hereinafter, referred to as "electrode precursor") is manufactured. Then, a laser, or the like, is used to cut out the electrode plate from the electrode precursor. By doing this, it is possible to obtain the electrode plate having a desired size. For cutting out this electrode plate, various lasers can be used, such as a continuous wave laser (CW laser) or a pulse laser (see JP2018-37308).

Anyway, an electrode tab on which the electrode core body is exposed might be formed at a part of the electrode plate. When a secondary battery is constructed, this electrode tab and a conductive member (electrical collector member, or the like) are connected. When the electrode plate including this electrode tab is manufactured, at first, an area (core body exposed area) on which no electrode active material layer is disposed and the electrode core body is exposed is formed at the electrode precursor. Then, when the electrode precursor is cut out from the electrode plate, a part of the core body exposed area is cut out. By doing this, it is possible to manufacture the electrode plate including the part (electrode tab) of the core body exposed area.

SUMMARY

However, in the manufacture of the electrode plate including the electrode tab, it might happen that a melted fine metal piece (sputter) is scattered, when the laser cut is performed on the core body exposed area on which the metal foil (electrode core body) is exposed. And, this sputter might stick on the electrode tab of the electrode plate. Then, in the secondary battery after construction, a possibility is increased that a microscopic inside short circuit is generated if a large amount of sputters sticking to the electrode tab unstick.

The present disclosure has been made in view of the above-described circumstances, and an objective is to provide a technique for decreasing the sticking number of the sputters to the electrode tab of the electrode plate.

In order to implement the objective described above, a herein disclosed manufacturing method of an electrode plate is provided.

A manufacturing method of an electrode plate disclosed herein is for manufacturing an electrode plate comprising an electrode core body being a metal foil and an electrode active material layer provided on a surface of the electrode core body. The manufacturing method comprises a precursor preparation step for preparing an electrode precursor comprising an active material provided area provided on the surface of the electrode core body; and a core body exposed area and a core body exposed area cutting step for cutting off the core body exposed area with a laser so as to form an electrode tab. Here, the electrode core body comprises a first surface, and a second surface disposed at an opposite side of the first surface, a surface roughness of the second surface is smaller than a surface roughness of the first surface. And, in the core body exposed area cutting step, the laser is irradiated to the first surface.

The herein disclosed technique has been implemented by focusing on a point that difference of surface roughness on each surface of the electrode core body takes large effects on the sticking amount of the sputters. In particular, the present inventors have found that the sticking amount of the sputters on the laser irradiated surface is hardly affected from the surface roughness of the laser irradiated surface. On the other hand, the present inventors have found that the sticking amount of the sputters on the laser non-irradiated surface is easily affected from the surface roughness of the laser non-irradiated surface. In particular, the sticking amount of the sputters becomes larger as the surface roughness of the laser non-irradiated surface is larger. In consideration of this, regarding the herein disclosed manufacturing method of the electrode plate, a surface (second surface) of the electrode core body whose surface roughness is smaller is treated as the laser non-irradiated surface. By doing this, it becomes hard that the sputters scattered to the laser non-irradiated surface side of the electrode core body stick on the laser non-irradiated surface of the electrode core body.

In a suitable aspect of the herein disclosed manufacturing method of the electrode plate, the laser is a pulse laser. The pulse laser can easily cut the electrode plate more than the other lasers (CW laser, or the like). On the other hand, the pulse laser tends to increase the scattering amount of the sputters. However, according to the herein disclosed manufacturing method, it is possible to sufficiently decrease the sticking amount of the sputters even when the scattering amount of the sputters is increased by use of the pulse laser.

In a suitable aspect of the herein disclosed manufacturing method of the electrode plate, the electrode core body contains a copper or a copper alloy. The sputters generated from the negative electrode core body containing these copper type materials have higher electrical conductive properties, and thus tend to cause reduction in the battery performance caused by microscopic inside short circuits. However, the herein disclosed manufacturing method of the electrode plate can decrease the sticking amount of the sputters to the electrode tab. Thus, it is possible to suitably inhibit reduction in the battery performance caused by the microscopic inside short circuits, even when the electrode core body containing copper type materials is used.

In a suitable aspect of the herein disclosed manufacturing method of the electrode plate, an average roughness of the second surface is equal to or more than 0.07 μm and equal to or less than 0.25 μm. By using the electrode core body including the second surface whose surface roughness is smaller as described above, it is possible to suitably decrease the sticking amount of the sputters.

In a suitable aspect of the herein disclosed manufacturing method of the electrode plate, an average roughness of the first surface is equal to or more than 0.1 μm and equal to or less than 0.3 μm. According to the herein disclosed manufacturing method of the electrode plate, it is possible to decrease the sticking amount of the sputters to the electrode core body even when the electrode core body including this kind of first surface is used.

A suitable aspect of the herein disclosed manufacturing method of the electrode plate, the method further comprising an active material provided area cutting step for cutting the active material provided area with a laser, the electrode plate including a plurality of electrode tabs protrude from a side edge part of the active material provided area is manufactured by alternately performing the core body exposed area cutting step and the active material provided area cutting step. By doing this, it is possible to minimize the laser cut for the core body exposed area that causes a large amount of sputters scattered at a surface side of the electrode plate. Thus, it is possible to further decrease the sticking amount of the sputters to the electrode tab.

In addition, as another aspect of the herein disclosed technique, a manufacturing method of a secondary battery is provided. The manufacturing method of the secondary battery is a method for manufacturing a secondary battery that includes an electrode body provided with a positive electrode plate and a negative electrode plate. In the manufacturing method of the secondary battery, at least one of a positive electrode plate and a negative electrode plate is manufactured by using the manufacturing method of the electrode plate having the above described configuration. By doing this, it is possible to suppress the sputters from unsticking from the electrode plate inside the secondary battery after the manufacture. As this result, it is possible to inhibit the reduction in the performance of the secondary battery.

A suitable aspect of the herein disclosed manufacturing method of the secondary battery, the method further comprising an electrode body manufacturing step for manufacturing an electrode body including an electrode tab group laminated a plurality of the electrode tabs; and an electrical collector member connecting step for connecting one of surface of the electrode tab group to an electrical collector member. Here, in the electrical collector member connecting step, the second surface of the electrode core body is arranged on another surface of the electrode tab group to which the electrical collector member is not connected. By doing this, it is possible to seal the first surface, whose sticking amount of the sputters is larger than the second surface, between the electrode tab and the electrical collector member (or between plural electrode tabs). Thus, it is possible to suitably suppress the sputters from unsticking from the electrode plate.

In addition, as another aspect of the herein disclosed technique, an electrode plate is provided. The electrode plate disclosed herein comprises an electrode core body being a metal foil and an electrode active material layer provided on a surface of the electrode core body. And, the electrode plate comprises an electrode plate main body part in which the electrode active material layer provided on the surface of the electrode core body; and an electrode tab protruded from the electrode plate main body part, and comprising an exposed area. And, the electrode core body comprises a first surface, and a second surface disposed at an opposite side of the first surface, a surface roughness of the second surface is smaller than a surface roughness of the first surface. Here, a number of metal particles sticking on the second surface is smaller than a number of metal particles sticking on the first surface in the electrode core body exposed on the electrode tab. The electrode plate is manufactured by the manufacturing method of the electrode plate including the above described configuration. This electrode plate has a structural feature that the sticking number of the metal particles (sputters) on the second surface, whose surface roughness is relatively smaller, is smaller.

In a suitable aspect of the herein disclosed electrode plate, a plurality of the electrode tabs protrude from an outside edge part of the electrode plate main body part to an outside, and each of the electrode tabs comprises an active material layer provided area, and located at a base portion of the electrode tab adjacent to the electrode plate main body part. In order to manufacture the electrode plate including the above described configuration, it is required to alternately perform the core body exposed area cutting step and the active material provided area cutting step. As described above, with applying this kind of manufacturing step, it is possible to minimize the laser cut of the core body exposed area on which a large amount of sputters are scattered. Thus, it is possible to further decrease the sticking amount of the sputters to the electrode tab.

In a suitable aspect of the herein disclosed electrode plate, a modified product fixing area with a modified product of the electrode active material layer fixed on the electrode core body is located at the outside edge part of the electrode plate main body part, and a width of the modified product fixing area on the first surface is larger than a width of the modified product fixing area on the second surface. In the herein disclosed electrode plate, the surface roughness of the first surface of the electrode core body is larger than the second surface. Thus, it is possible to suppress the large amount of modified products of the electrode active material layer from unsticking from the electrode core body, although the modified products have stuck to the first surface being the laser irradiated surface.

In addition, as another aspect of the herein disclosed technique, a secondary battery is provided. The secondary battery as described above is a secondary battery that includes an electrode body provided with a positive electrode plate and with a negative electrode plate. At least one of the positive electrode plate and the negative electrode plate is an electrode plate including the above described configuration. By doing this, it is possible to suppress the sputter from unsticking from the electrode plate inside the secondary battery. As this result, it is possible to inhibit the reduction in the performance of the secondary battery caused by the microscopic inside short circuits.

In a suitable aspect of the herein disclosed secondary battery, the electrode body comprises an electrode tab group laminated a plurality of the electrode tabs, an electrical collector member connected to one surface of the electrode tab group, and the second surface of the electrode core body is arranged on another surface of the electrode tab group to which the electrical collector member is not connected. By doing this, the first surface whose sticking amount of the sputters is larger than the second surface can be sealed between the electrode tab and the electrical collector member (or, plural electrode tabs). Thus, it is possible to suitably suppress the sputters from unsticking from the electrode tab.

In a suitable aspect of the herein disclosed secondary battery, an electrode tab group is folded and bent so as to make an electrical collector member and a side surface of an electrode body be opposed to each other.

BRIEF DESCRIPTION OF THE DRAWINGS

FIG. 9 is a lateral cross section view that is schematically shown along a IX-IX line of

FIG. 6.

DETAILED DESCRIPTION

Below, while referring to drawings, an embodiment for a herein disclosed technique is explained. Incidentally, the matters other than matters particularly mentioned in this specification and required for practicing the present disclosure (for example, a general configuration of a battery and a manufacture process) can be grasped as design matters of those skilled in the art based on the related art in the present field. The herein disclosed technique can be executed based on the contents disclosed in the present specification, and the technical common sense in the present field. Incidentally, a wording "A to B" representing a range in the present specification semantically covers not only a meaning equal to or more than A and not more than B, but also meanings of "preferably more than A" and "preferably less than B".

Incidentally, a term "secondary battery" in the present specification widely means an electric storage device that generates a charge and discharge reaction in response to movement of charge carriers between a pair of electrodes (positive electrode and negative electrode) via an electrolyte. The secondary battery as described above semantically covers not only a so-called storage battery, such as lithium ion secondary battery, nickel hydrogen battery, and nickel cadmium battery, but also a capacitor, such as electric double layer capacitor, or the like.

1. Manufacturing Method of Electrode Plate

Figures 1, 2:
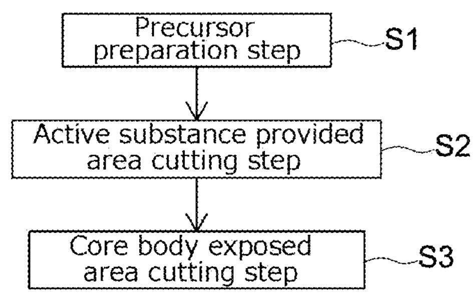
FIG. 1 is a flowchart that shows a manufacturing method of an electrode plate in accordance with one embodiment.
FIG. 2 is a plane view that schematically shows a negative electrode plate manufactured by the manufacturing method of the electrode plate in accordance with one embodiment.
Figure 3:
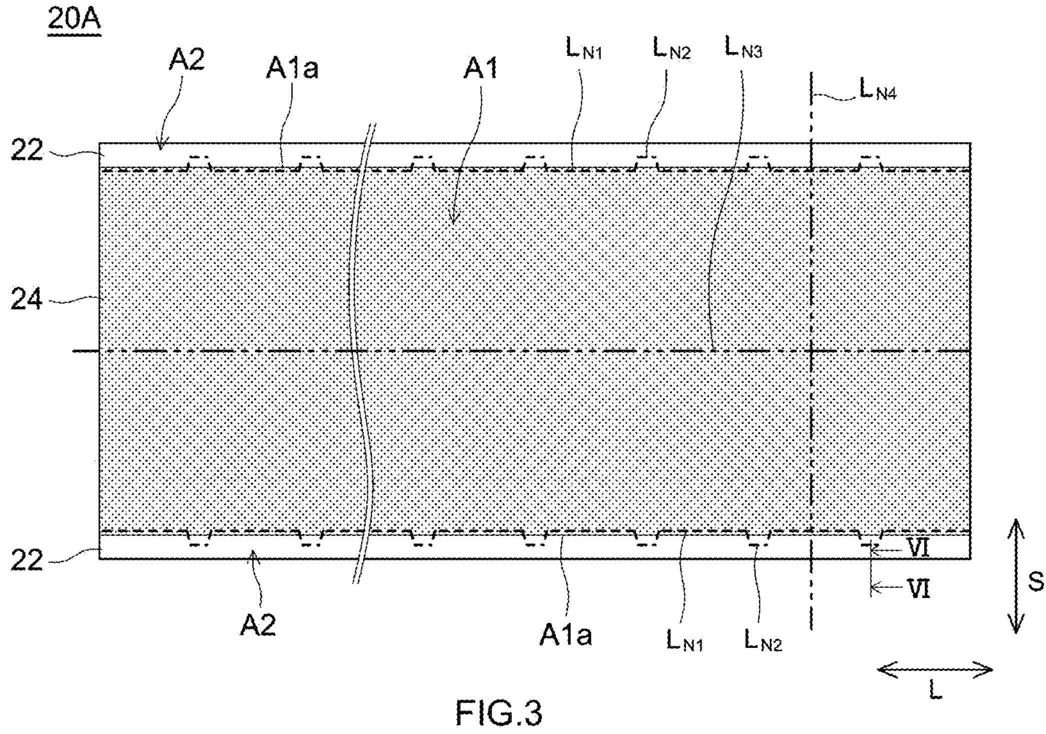
FIG. 3 is a plane view that is for explaining the manufacturing method of the electrode plate in accordance with one embodiment.
Figure 4:
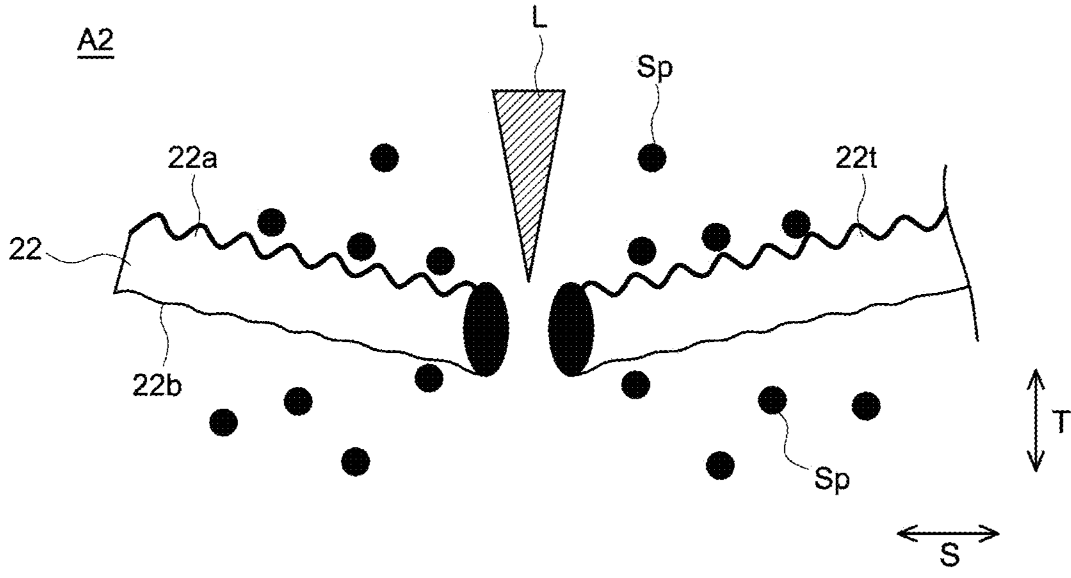
FIG. 4 is a IV-IV view-arrow cross section view of FIG. 3.
Figure 5:
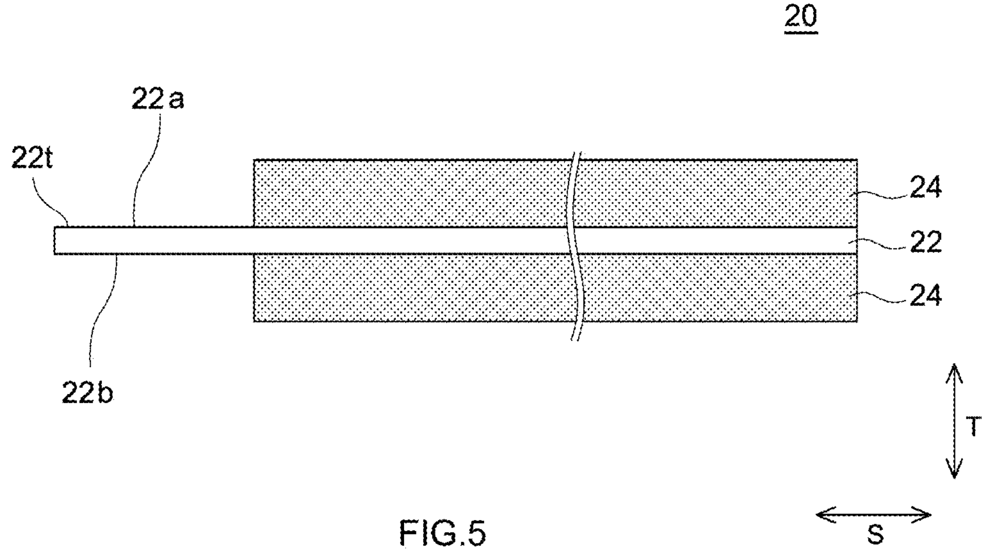
FIG. 5 is a V-V view-arrow cross section view of FIG. 2.

A manufacturing method of an electrode plate disclosed herein is to manufacture an electrode plate for a secondary battery. Below, as an embodiment of the manufacturing method of the electrode plate disclosed herein, a method for manufacturing an electrode plate (negative electrode plate) at a negative electrode side of a lithium ion secondary battery is explained. FIG. 1 is a flowchart that shows the manufacturing method of the electrode plate in accordance with the present embodiment. FIG. 2 is a plane view that schematically shows a negative electrode plate manufactured by the manufacturing method of the electrode plate in accordance with the present embodiment. FIG. 3 is a plane view that is for explaining the manufacturing method of the electrode plate in accordance with the present embodiment. In addition, FIG. 4 is a IV-IV view-arrow cross section view of FIG. 3. FIG. 5 is a V-V view-arrow cross section view of FIG. 2. Incidentally, in FIGS. 2 to 5, a reference sign L represents "longitudinal direction" of a negative electrode plate 20 (or, negative electrode precursor 20A), a reference sign S represents "shorter direction", and a reference sign T represents "thickness direction".

As shown in FIG. 1, the manufacturing method of the electrode plate in accordance with the present embodiment includes a precursor preparation step S1, an active material provided area cutting step S2, and a core body exposed area cutting step S3. By doing this, the negative electrode plate 20 shown in FIG. 2 is manufactured. Below, the negative electrode plate 20 being a manufactured object will be explained, and then each of steps shown in FIG. 1 will be described.

(1) Negative Electrode Plate

As shown in FIG. 2, the negative electrode plate 20 is a long strip-like shaped member. The negative electrode plate 20 comprises a negative electrode core body 22 being a long metal foil, and a negative electrode active material layer 24 provided on a surface of the negative electrode core body 22. Incidentally, it is preferable that the negative electrode active material layer 24 is provided on both surfaces of the negative electrode core body 22 (see FIG. 5). By doing this, it is possible to construct a secondary battery having a better battery performance. Then, the negative electrode plate 20 of the present embodiment includes 2 areas in a plane view. One area is an electrode plate main body part 20*b*, another area is a negative electrode tab 22*t*. In the electrode plate main body part 20*b*, the negative electrode active material layer 24 is provided on the surface of the negative electrode core body 22. On the other hand, the negative electrode tab 22*t* protrudes from the electrode plate main body part 20*b*. The negative electrode tab 22*t* comprises an exposed area where the negative electrode core body 22 is exposed. That is, in the exposed area of the negative electrode tab 22*t*, the negative electrode active material layer 24 is not provided on the surface of the negative electrode core body 22.

A plurality of the negative electrode tabs 22*t* protrude toward an outside (upward in a shorter direction S of FIG. 2) from an outside edge part 20*b*1 of the electrode plate main body part 20*b*. These negative electrode tabs 22*t* are provided while being spaced away from each other by a predetermined interval in a longitudinal direction L of the negative electrode plate 20. In addition, at a base portion of the negative electrode tab 22*t* adjacent to the electrode plate main body part 20*b*, an active material layer provided area is formed on which the negative electrode active material layer 24 is provided. Although described later in more details, the negative electrode plate 20 having a configuration as described above can be manufactured by alternately performing the active material provided area cutting step S2 and the core body exposed area cutting step S3 at plural times. By doing this, it is possible to minimize the laser cut of a negative electrode core body exposed area A2 (see FIG. 3) on which a large amount of sputters are scattered. As the result, it is possible to further decrease a sticking amount of the sputters to the negative electrode tab 22*t*.

For each of members configuring the negative electrode plate 20, it is possible to use a material used in a conventionally known general secondary battery, without particular restriction. For example, a metal material having a predetermined electrically conductive property is used for the negative electrode core body 22. It is preferable that the negative electrode core body 22 as described above is made of, for example, copper or copper alloy. These copper type materials have suitable electrically conductive properties, are inexpensive, and thus are suitable as materials for the negative electrode core body 22. On the other hand, the sputters generated from the negative electrode core body 22 containing the copper type materials have higher electrically conductive properties, and thus tend to easily cause a microscopic inside short circuit. However, the manufacturing method of the electrode plate in accordance with the present embodiment can suppress the sputters generated at the laser cut time from sticking to the negative electrode tab 22*t*. In addition, the negative electrode core body 22 might contain a material other than the copper type materials. For example, the negative electrode core body 22 might contain a sub-component, such as chromium (Cr). By containing this kind of sub-component having a higher melting point into the negative electrode core body 22, it is possible to decrease a scattering amount of the sputters at the laser cut time. In addition, a thickness of the negative electrode core body 22 is preferably 3 μm to 50 μm, or further preferably 5 μm to 20 μm.

On the other hand, the negative electrode active material layer 24 is a layer containing a negative electrode active material. For the negative electrode active material, in consideration of relation to the positive electrode active material, a material capable of reversibly storing and emitting charge carriers is used. As for the negative electrode active material, it is possible to use a carbon material, a silicon type material, or the like. As the carbon material, for example, it is possible to use graphite, hard carbon, soft carbon, amorphous carbon, or the like. In addition, it is possible to use amorphous carbon covered graphite, in which a surface of the graphite is covered with amorphous carbon, or the like. On the other hand, as for the silicon type material, it is possible to use silicon, silicon oxide (silica), or the like. In addition, the silicon type material might contain other metal elements (e.g., alkaline earth metals) or oxide of said other metal elements. In addition, the negative electrode active material layer 24 might contain an additive agent other than the negative electrode active material. As one example for the additive agent described above, it is possible to use a binder, a thickening agent, or the like. As a specific example for the binder, it is possible to use a rubber type binder, such as styrene butadiene rubber (SBR). In addition, as a specific example for the thickening agent, it is possible to use carboxymethyl cellulose (CMC), or the like. In addition, a thickness of the negative electrode active material layer 24 is preferably 10 μm to 500 μm, further preferably 30 μm to 400 μm, or furthermore preferably 50 μm to 300 μm.

The negative electrode plate 20 including the above-described configuration is manufactured by performing the precursor preparation step S1, the active material provided area cutting step S2, and the core body exposed area cutting step S3 shown in FIG. 1. Below, each of steps will be described.

(2) Precursor Preparation Step S1

At the present step, an electrode precursor being a precursor of the electrode plate is prepared. The electrode precursor shown in FIG. 3 is a precursor (negative electrode precursor 20A) of the negative electrode plate. This negative electrode precursor 20A includes the negative electrode core body 22 that is a metal foil formed in a strip-like shape. The area size of the negative electrode core body 22 of this negative electrode precursor 20A is larger than an area size of the negative electrode plate 20 (see FIG. 2) after the manufacture. Then, the negative electrode active material layer 24 is provided on the surface of the negative electrode core body 22. Incidentally, the negative electrode active material layer 24 is provided at a central part of the negative electrode core body 22 in the shorter direction S to extend along the longitudinal direction L. In the present specification, the area on which this negative electrode active material layer 24 is provided is referred to as "negative electrode active material provided area A1". On the other hand, the negative electrode active material layer 24 is not provided at both side edge parts of the negative electrode precursor 20A (both outside areas of the negative electrode active material layer 24 in the shorter direction S) where the negative electrode core body 22 is exposed. In the present specification, the area on which the negative electrode core body 22 is exposed is referred to as "negative electrode core body exposed area A2". A means for preparing the negative electrode precursor 20A including the above-described configuration is not particularly restricted, and thus various conventionally known methods can be used without particular restriction. For example, by coating the surface of the negative electrode core body 22 with a raw material paste containing the negative electrode active material, or the like, and then by drying the resultant, it is possible to manufacture the negative electrode precursor 20A. In addition, the present step is not particularly restricted, if the negative electrode precursor 20A can be prepared. For example, the negative electrode precursor 20A including the above-described configuration might be purchased for the preparation. Incidentally, it is sufficient for the negative electrode precursor to include the negative electrode active material provided area and the negative electrode core body exposed area, and thus the negative electrode precursor is not restricted to the structure shown in FIG. 2. For example, it is possible for the negative electrode precursor to select a structure in which the negative electrode core body exposed area is formed at only one of side edge parts.

(3) Active Material Provided Area Cutting Step S2

The manufacturing method of the electrode plate in accordance with the present embodiment includes the active material provided area cutting step S2 for using laser to cut the negative electrode active material provided area A1 of the negative electrode precursor 20A. Particularly, in the active material provided area cutting step S2, the laser is allowed to scan on the negative electrode active material provided area A1 along a side edge part Ala of the negative electrode active material provided area A1 (see a dotted line LN1 in FIG. 3). By doing this, it is possible to suitably inhibit the sputter from sticking to the negative electrode plate 20 after the manufacture. In particular, the negative electrode active material layer 24 works as a wall to shut out the sputter while the laser cut is performed on the negative electrode active material provided area A1 as shown in the present step, the sputter is hardly scattered to a surface side of the negative electrode plate 20. On the other hand, the negative electrode active material layer 24 working as the wall does not exist during the later-described core body exposed area cutting step S3 (dotted line LN2 in FIG. 3), and thus the sputter is easily scattered to the surface side of the negative electrode plate 20. In other words, as shown in FIG. 3, by alternately performing the core body exposed area cutting step S3 (dotted line LN2) and the active material provided area cutting step S2 (dotted line LN1), it is possible to minimize the laser cut of the negative electrode core body exposed area A2. By doing this, it is possible to drastically decrease the scattering amount itself of the sputter. In addition, at the side edge part Ala of the negative electrode active material provided area A1, a thickness of the negative electrode active material layer 24 tends to be ununiform. For this circumstance, when the active material provided area cutting step S2 is performed, the side edge part Ala of the negative electrode active material provided area A1 can be cut off. By doing this, it is possible to contribute in manufacturing the negative electrode plate 20 in which thickness of the negative electrode active material layer 24 is uniform.

(4) Core Body Exposed Area Cutting Step S3

In the core body exposed area cutting step S3, the negative electrode core body exposed area A2 of the negative electrode precursor 20A is cut with a laser so that the negative electrode tab 22*t* is formed. In particular, at the present step, firstly, the laser is allowed to scan along the shorter direction S of the negative electrode precursor 20A from the negative electrode active material provided area A1 to the negative electrode core body exposed area A2 (see the dotted line LN2 in FIG. 3). Then, in the negative electrode core body exposed area A2, the laser is allowed to scan for a predetermined distance along the longitudinal direction L of the negative electrode precursor 20A. Then, the pulse laser is allowed to scan along the shorter direction S to the negative electrode active material provided area A1, again. By doing this, a part of the negative electrode core body exposed area A2 is cut out in a convex shape so as to form the negative electrode tab 22*t* (see FIG. 2). Then, as described above, the manufacturing method in accordance with the present embodiment repeats the active material provided area cutting step S2 (dotted line LN1) and the core body exposed area cutting step S3 (dotted line LN2), by constant intervals. By doing this, it is possible to cut and remove the side edge part Ala of the negative electrode active material provided area A1. As a result, a plurality of negative electrode tabs 22*t* are cut out.

Here, as shown in FIG. 4, the negative electrode core body 22 used in the present embodiment includes a first surface 22*a*, and a second surface 22*b* that is a surface at a side opposite to the first surface 22*a* and whose surface roughness is smaller than a surface roughness of the first surface 22*a*. Then, the manufacturing method in accordance with the present embodiment is to irradiate laser L to the first surface 22*a* at the core body exposed area cutting step S3. In other words, regarding the present embodiment, the second surface 22*b* whose surface roughness is relatively smaller is treated as a laser non-irradiated surface. By doing this, it is possible to decrease a sticking number of sputters Sp to the negative electrode tab 22*t* of the negative electrode plate 20 after the manufacture. Below, the reason why the manufacturing method of the electrode plate in accordance with the present embodiment can decrease the sticking number of the sputters will be explained in comparison with a conventional manufacturing method of the electrode plate (see FIG. 16).

Figure 16:
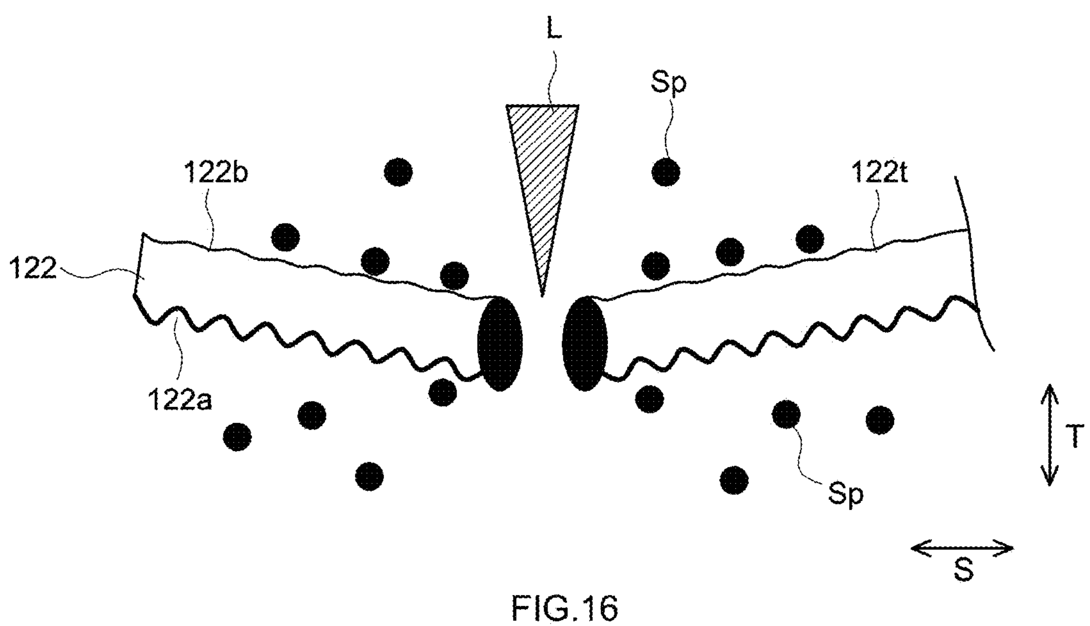
FIG. 16 is a cross section view that is for explaining a manufacturing method of a conventional electrode plate.

At first, as shown in FIG. 16, regarding the manufacture of the electrode plate, it might happen that a surface (second surface 122*b*) whose surface roughness is smaller becomes a laser irradiated surface and a surface (first surface 122*a*) whose surface roughness is larger becomes a laser irradiated surface. If the laser cut on the negative electrode core body exposed area A2 (negative electrode core body 122) is performed in this state, it is estimated that, due to a following mechanism, a large amount of sputters Sp stick to both of the first surface 122*a* and second surface 122*b* of the negative electrode core body 122. Firstly, when a laser is irradiated to the negative electrode core body exposed area A2, the negative electrode core body exposed area A2 is slightly bent so as to make the second surface 122*b* being the laser irradiated surface be formed in a concave shape. Then, the melt negative electrode core body 122 is scattered as the sputter Sp. At that time, the second surface 122*b* is already formed in a concave shape, and thus a state is satisfied that the scattered sputter Sp tends to easily stick. Therefore, the sticking amount of sputters Sp is hardly affected by the degree of the surface roughness of the second surface 122*b*. On the other hand, the first surface 122*a* is formed in a convex shape because the negative electrode core body exposed area A2 has become bent, and thus it is relatively hard that the scattered sputter Sp stick to the first surface. However, if the surface roughness of the first surface 122*a* is larger, the sputter Sp becomes easily sticking because of the concave and convex part of the surface. Thus, if the surface roughness of the first surface 122*a* being the laser non-irradiated surface is larger, the sticking amount of the sputters Sp, on the negative electrode plate (typically, negative electrode tab 122*t*) after cut, becomes larger.

In contrast, as shown in FIG. 4, the manufacturing method n accordance with the present embodiment, at the core body exposed area cutting step S3, irradiates laser L to the first surface 22*a* while the second surface 22*b* whose surface roughness is smaller is treated as the laser non-irradiated surface. In other words, the manufacturing method in accordance with the present embodiment includes a step for confirming the surface roughnesses of both surfaces of the negative electrode core body 22 and includes a step for irradiating the laser L to the first surface 22*a*. By doing this, it is possible to inhibit the scattered sputter Sp from being collected by the second surface 22*b* of the negative electrode core body 22. On the other hand, the manufacturing method in accordance with the present embodiment arranges the first surface 22*a*, being the surface whose surface roughness is larger, on the laser irradiated surface on which the sputter tends to easily stick, so as to be regardless of the degree of the surface roughness. By doing this, it is possible to manufacture the negative electrode core body 22 in which the sticking amount of the sputters on the second surface 22*b* having a relatively smaller surface roughness is drastically decreased.

Incidentally, the sticking amount of the sputters Sp to the second surface 22*b* tends to become smaller as the surface roughness of the second surface 22*b* of the negative electrode core body 22 becomes smaller. From a perspective as described above, a maximum height Sz of the second surface 22*b* is preferably equal to or less than 2.5 μm, further preferably equal to or less than 2.0 μm, further preferably equal to or less than 1.8 μm, or in particular preferably equal to or less than 1.4 μm. On the other hand, from a perspective of decreasing the sticking amount of the sputters, a lower limit of the maximum height Sz of the second surface 22*b*, which is not particularly restricted, might be equal to or more than 0.7 μm, might be equal to or more than 0.9 μm, or might be equal to or more than 1.0 μm. Incidentally, "maximum height Sz" in the present specification was measured in accordance with ISO25178, and is a sum of a maximum peak height Sp and a maximum root depth Sv of the surface roughness measurement for the negative electrode core body.

In addition, from a perspective of decreasing the sticking amount of the sputters Sp to the second surface 22*b*, an average roughness Sa of the negative electrode core body 22 is preferably equal to or less than 0.25 μm, further preferably equal to or less than 0.2 μm, further preferably equal to or less than 0.18 μm, or in particular preferably equal to or less than 0.14 μm. On the other hand, a lower limit of the average roughness Sa of the second surface 22*b*, which is not particularly restricted, might be equal to or more than 0.07 μm, might be equal to or more than 0.09 μm, or might be equal to or more than 0.1 μm. Incidentally, "average roughness Sa" in the present specification was also measured in accordance with ISO25178.

On the other hand, as described above, the first surface 22*a* is a laser irradiated surface, and thus a constant amount of sputters stick to the first surface, regardless the surface roughness. Therefore, from a perspective of decreasing the sticking amount of the sputters, the surface roughness of the first surface 22*a* is not particularly restricted. For example, the maximum height Sz of the first surface 22*a* might be equal to or less than 3 μm, might be equal to or less than 2.5 μm, or might be equal to or less than 1.8 μm. On the other hand, the lower limit value of the maximum height Sz of the first surface 22*a* might be equal to or more than 1 μm, might be equal to or more than 1.25 μm, or might be equal to or more than 1.5 μm. In addition, the average roughness Sa of the first surface 22*a* might be equal to or less than 0.3 μm, might be equal to or less than 0.25 μm, or might be equal to or less than 0.18 μm. In addition, the average roughness Sa of the first surface 22*a* might be equal to or more than 0.1 μm, or might be equal to or more than 0.14 μm.

Incidentally, a kind of the laser used in the herein disclosed manufacturing method of the electrode plate is not particularly restricted. Regarding the laser, a conventionally known laser capable of being used for cutting the electrode precursor can be used without particular restriction. As one example for this kind of laser, it is possible to use a continuous oscillation laser (CW laser) or a pulse laser. Among them, the pulse laser can concentrate and add a large amount of energy for a short time width (peak output is high). Therefore, the pulse laser can contribute in cutting the negative electrode precursor 20A fast and in enhancing the manufacture efficiency. On the other hand, regarding the pulse laser, impact at the laser irradiation time is larger, and thus it might cause the increase in the sputter scattering amount at the time of cutting the negative electrode core body 22. However, the manufacturing method in accordance with the present embodiment can sufficiently decrease the sticking amount of the sputters to the negative electrode tab 22*t*, even when the scattering amount of the sputters is increased. Therefore, it is possible to suitably solve the problem caused by using the pulse laser.

Incidentally, a laser irradiation condition for the herein disclosed technique is not particularly restricted, and it is preferable that the laser irradiation condition is suitably adjusted, based on a kind of the laser, or a structure of the negative electrode precursor 20A (typically, thickness or material of the negative electrode active material layer 24 or negative electrode core body 22). As one example, it is preferable that a repeat frequency is made to be smaller when the pulse laser is used. By doing this, a laser irradiating number becomes smaller, and thus the scattering amount of the sputters can be decreased. From a perspective as described above, a frequency of the pulse laser is preferably equal to or less than 1000 KHz, or further preferably equal to or less than 800 KHz. On the other hand, it is possible to concentrate and add a large amount of energy for a short time width when the frequency of the pulse laser is increased, and thus it is possible to contribute in enhancing the manufacture efficiency. From a perspective as described above, the frequency of the pulse laser is preferably equal to or more than 50 KHz, or further preferably equal to or more than 80 KHz.

In addition, an average output in a situation of using the pulse laser is preferably equal to or more than 50 W, further preferably equal to or more than 80 W, or in particular preferably equal to or more than 95 W. As the average output of the pulse laser is increased more, cutting the negative electrode precursor 20A tends to become easier. On the other hand, the average output of the pulse laser is preferably equal to or less than 500 W, further preferably equal to or less than 300 W, or in particular preferably equal to or less than 285 W. The impact at the laser irradiation time becomes smaller as the average output of the pulse laser becomes smaller, and thus the scattering amount of the sputters tends to become smaller. In addition, a pulse width in a situation of using the pulse laser is preferably equal to or more than 30 ns, further preferably equal to or more than 50 ns, or in particular preferably equal to or more than 60 ns. A time for heating the negative electrode precursor 20A becomes longer as the pulse width becomes larger, and thus cutting the negative electrode precursor 20A tends to become easier. On the other hand, the pulse width of the pulse laser is preferably equal to or less than 300 ns, further preferably equal to or less than 200 ns, furthermore preferably equal to or less than 150 ns, or in particular preferably equal to or less than 120 ns. A melted amount of the negative electrode core body 22 becomes smaller as the pulse width becomes smaller, and thus the scattering amount of the sputters tends to become smaller.

In addition, the spot diameter of the pulse laser is preferably 10 μm to 60 μm, further preferably 20 μm to 50 μm, or furthermore preferably 25 μm to 40 μm. By doing this, it is possible to easily cut out the negative electrode plate 20 from the negative electrode precursor 20A. Furthermore, a scanning speed of a pulse laser is preferably equal to or less than 5000 mm/sec, or further preferably equal to or less than 3000 mm/sec. By making the scanning speed be slower as described above, it is possible to suppress the cut failure of the negative electrode core body 22. On the other hand, a lower limit value of the scanning speed of the pulse laser is not particularly restricted, and might be equal to or more than 20 mm/sec. Incidentally, from a perspective of enhancing a manufacture efficiency due to the shorten cut time, the lower limit value of the scanning speed of the pulse laser is preferably equal to or more than 200 mm/sec, or further preferably equal to or more than 500 mm/sec.

(5) Another Step

As described above, the manufacturing method in accordance with the present embodiment repeats the active material provided area cutting step S2 (dotted line LN1 in FIG. 3) and the core body exposed area cutting step S3 (dotted line LN2 in FIG. 3), every constant interval. By doing this, it is possible to cut and remove the side edge part Ala of the negative electrode active material provided area A1. As a result, a plurality of the negative electrode tabs 22*t* are formed. Furthermore, as shown by the two-dot chain line LN3 in FIG. 3, the manufacturing method in accordance with the present embodiment cuts the central part, in the shorter direction S of the negative electrode precursor 20A, along the longitudinal direction L.

By doing this, as shown in FIG. 2, it is possible to manufacture the negative electrode plate 20 on which the negative electrode tab 22*t* is formed only at one side of the outside edge part 20*b*1 of the electrode plate main body part 20*b*. In addition, as shown by the two-dot chain line LN4, the present embodiment performs cutting the negative electrode precursor 20A along the shorter direction S, with predetermined intervals spaced away in the length direction L. By doing this, it is possible to manufacture the negative electrode plate 20 whose length is desired. Incidentally, for cutting the negative electrode precursor 20A along the two-dot chain lines LN3 and LN4, a cut blade, a metal mold, a cutter, or the like can be used, while the laser cut is not used. In addition, cutting along these two-dot chain lines LN3 and LN4 does not restrict the herein disclosed technique, and it is sufficient to suitably perform cutting based on the shape of the negative electrode plate after the manufacture.

2. Structure of Negative Electrode Plate

Next, a detailed structure of the electrode plate (negative electrode plate 20) manufactured with the manufacturing method of the electrode plate in accordance with the present embodiment will be described.

Firstly, as shown in FIG. 2, the negative electrode plate 20 in accordance with the present embodiment includes the negative electrode core body 22 and the negative electrode active material layer 24. In addition, this negative electrode plate 20 includes the electrode plate main body part 20*b* that is an area on which the negative electrode active material layer 24 is provided on the surface of the negative electrode core body 22, and includes the negative electrode tab 22*t* that protrudes from the electrode plate main body part 20*b*, on which the negative electrode active material layer 24 is not provided, and that contains an exposed area on which the negative electrode core body 22 is exposed. These are already explained, and thus overlapping explanation will be omitted.

In addition, each of the negative electrode tabs 22*t* of the negative electrode plate 20 in accordance with the present embodiment includes an active material layer provided area at a base portion of the negative electrode tab 22*t* adjacent to the electrode plate main body part 20*b*, and the active material layer provided area is provided with the negative electrode active material layer 24. As described above, this active material layer provided area is formed, by repeating the active material provided area cutting step S2 and the core body exposed area cutting step S3 so as to manufacture the negative electrode plate 20. In addition, as the illustration is omitted, regarding the negative electrode plate 20 in accordance with the present embodiment, a modified product fixing area could be formed at the outside edge part 20*b*1 of the electrode plate main body part 20*b*, and in the modified product fixing area, a modified product of the negative electrode active material layer 24 is fixed on the negative electrode core body 22. This modified product fixing area can be formed by making the impact of the laser at the active material provided area cutting step S2 blow off a part of the negative electrode active material layer 24 and then making the heat of the laser induce heat-denature on the negative electrode active material layer 24. Then, as described above, in the present embodiment, the first surface (surface of the negative electrode core body 22 at a side whose surface roughness is relatively rough) of the negative electrode precursor 20A is treated as the laser irradiated surface. Thus, in the negative electrode plate 20 after the manufacture, a width of the modified product fixing area of the first surface can be larger than a width of the modified product fixing area of the second surface. Incidentally, in the present embodiment, the surface roughness of the first surface 22*a* (laser irradiated surface) of the negative electrode core body 22 is larger than the second surface 22*b* (laser non-irradiated surface). Thus, an effect can be induced that the many modified products having stuck on the first surface 22*a* hardly unstick from the negative electrode core body 22. In addition, it is preferable that a thickness of a layer of the modified product on the modified product fixing area is smaller than a thickness of the negative electrode active material layer 24.

Then, as shown in FIG. 5, the negative electrode core body 22 of the negative electrode plate 20 in accordance with the present embodiment includes the first surface 22*a* whose surface roughness is relatively larger, and includes the second surface 22*b* whose surface roughness is relatively smaller. As described above, regarding the manufacturing method in accordance with the present embodiment, the laser cut is performed to make the second surface 22*b* whose surface roughness is relatively smaller become the laser non-irradiated surface. Therefore, in the negative electrode tab 22*t* (exposed negative electrode core body 22) of the negative electrode plate 20 after the manufacture, a number of the metal particles (sputters) sticking on the second surface 22*b* is smaller than a number of the metal particle sticking on the first surface 22*a*. By using the negative electrode plate 20 as described above, it is possible to inhibit a situation, in which the sputters unstick inside the secondary battery and a microscopic inside short circuit is generated.

Incidentally, a particular sticking number of the metal particles (sputters) on the surface of each negative electrode tab 22*t* is not particularly restricted. For example, the sputter sticking number on the first surface 22*a* might be equal to or more than 20 pieces/$cm^2$, might be equal to or more than 25 pieces/$cm^2$, or might be equal to or more than 30 pieces/$cm^2$. On the other hand, the sputter sticking number on the first surface 22*a* is preferably equal to or less than 200 pieces/$cm^2$, further preferably equal to or less than 150 pieces/$cm^2$, furthermore preferably equal to or less than 100 pieces/$cm^2$, or in particular preferably equal to or less than 80 pieces/$cm^2$. On the other hand, the sputter sticking number on the second surface 22*b* might be 0 pieces/$cm^2$ (no sputter is sticking), might be equal to or more than 1 piece/$cm^2$, or might be equal to or more than 2 pieces/$cm^2$. On the other hand, the sputter sticking number on the second surface 22*b* is preferably equal to or less than 50 pieces/$cm^2$, further preferably equal to or less than 45 pieces/$cm^2$, or in particular preferably equal to or less than 40 pieces/$cm^2$. In addition, a sputter sticking rate of the second surface 22*b* with respect to the first surface 22*a* is preferably equal to or less than ½, further preferably equal to or less than ⅓, furthermore preferably equal to or less than ¼, or in particular preferably equal to or less than ⅕. Incidentally, "sticking number of sputter" is a number of metal particles which was confirmed by a microscope observation and whose particle diameter was equal to or more than 5 μm. In addition, a shape of the sputter, which is not restricted to a spherical shape, could become an oval shape, a rod shape, a needle shape, a plate shape, or the like. When these non-spherical sputters were confirmed, a number of metal particles whose maximum particle diameter, being the largest size, was equal to or more than 5 μm was counted as the sticking number of the sputters.

3. Secondary Battery

Figure 6:
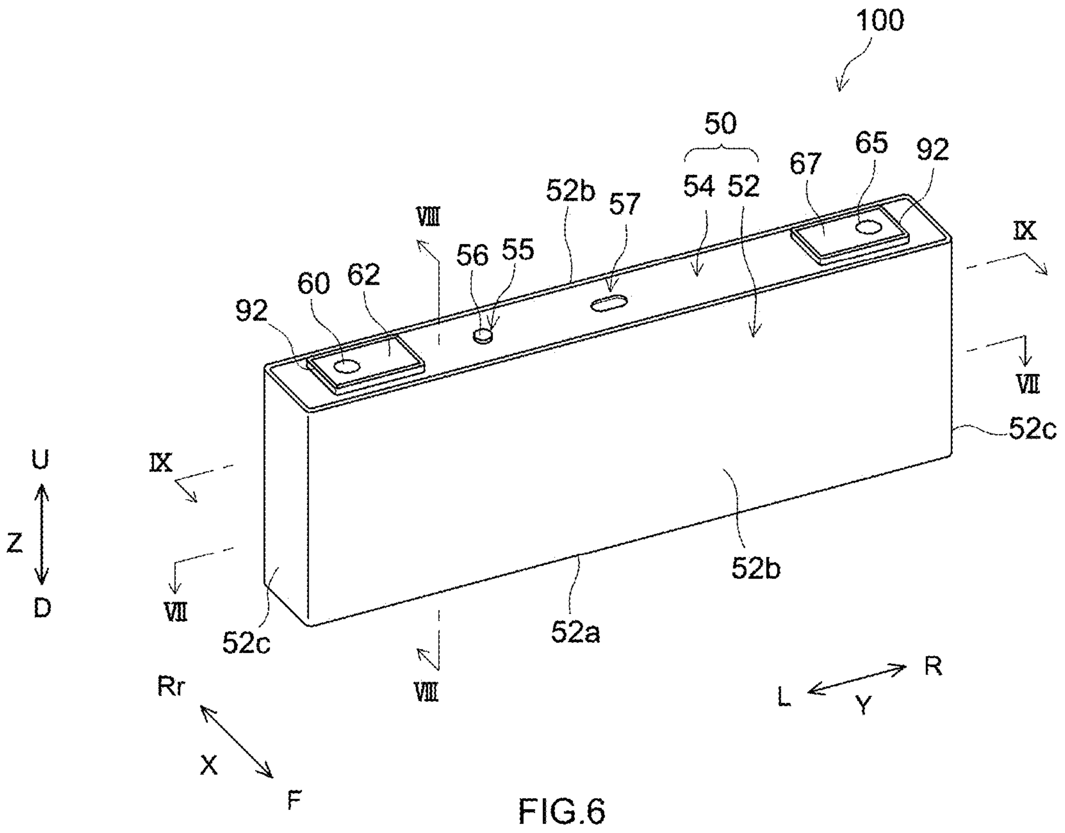
FIG. 6 is a perspective view that schematically shows a secondary battery in accordance with one embodiment.
Figure 7:
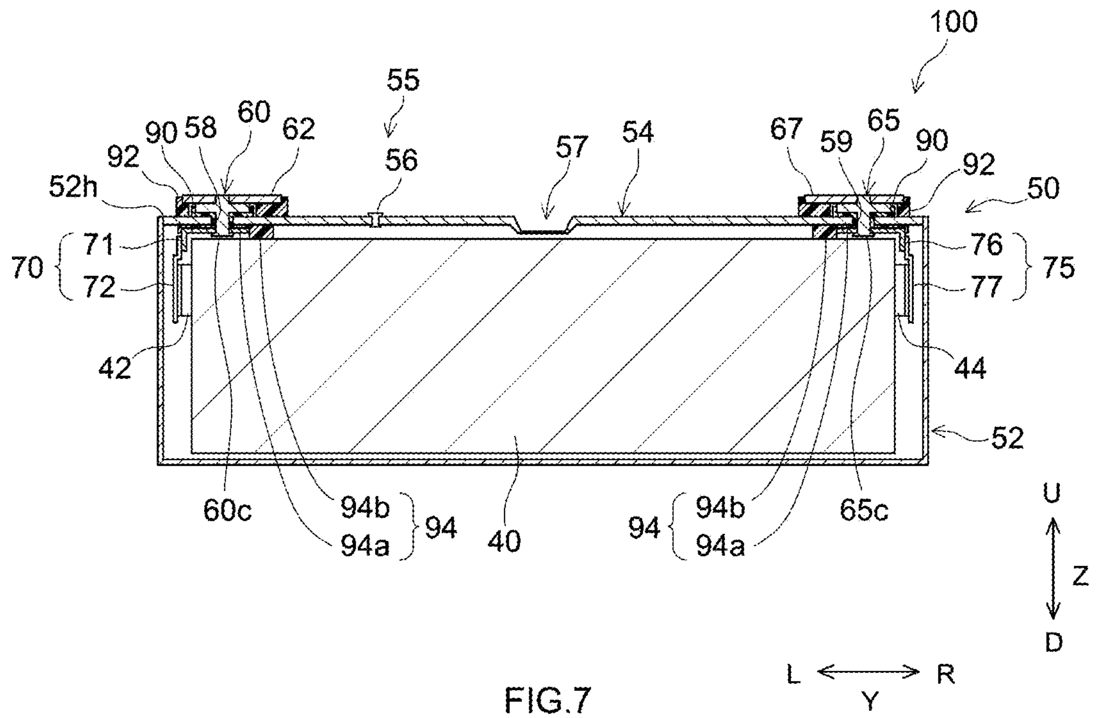
FIG. 7 is a longitudinal cross section view that is schematically shown along a VII-VII line of FIG. 6.
Figure 8:
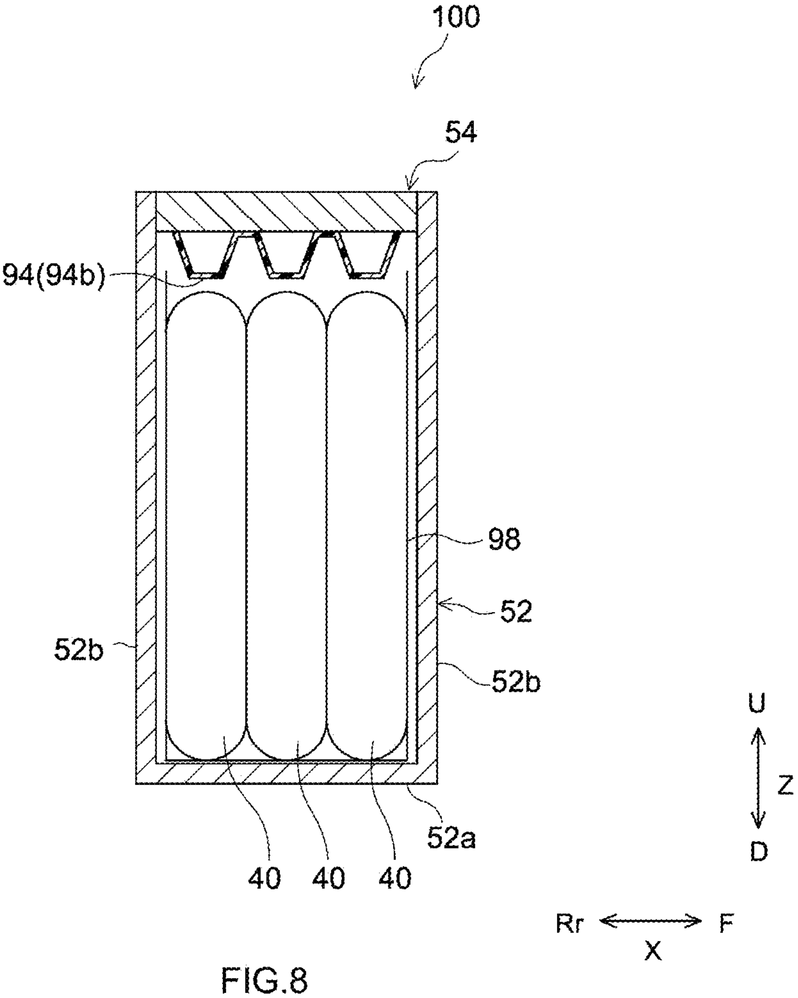
FIG. 8 is a longitudinal cross section view that is schematically shown along a VIII-VIII line of FIG. 6.
Figure 9:
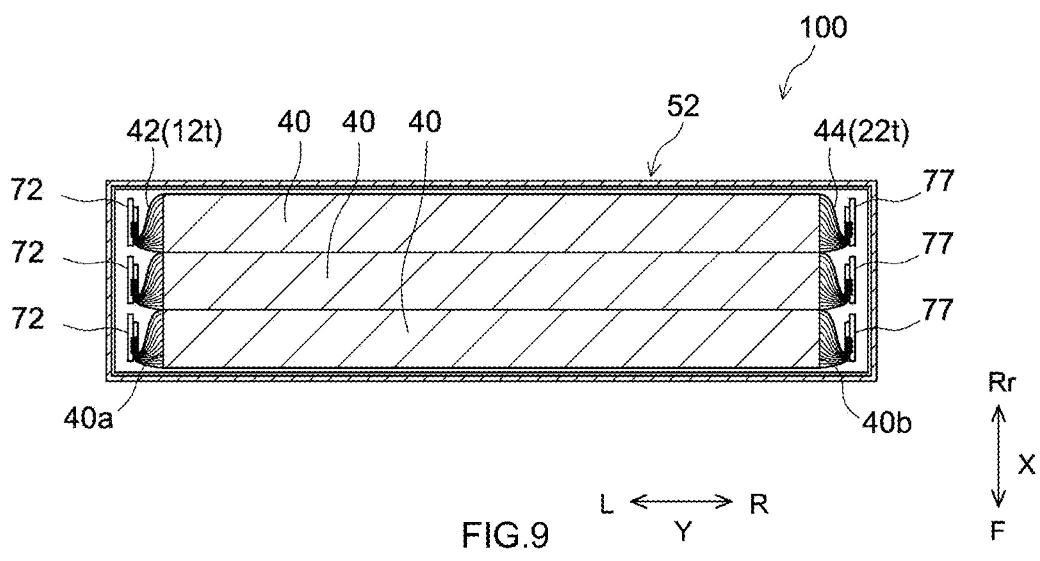
Figure 10:
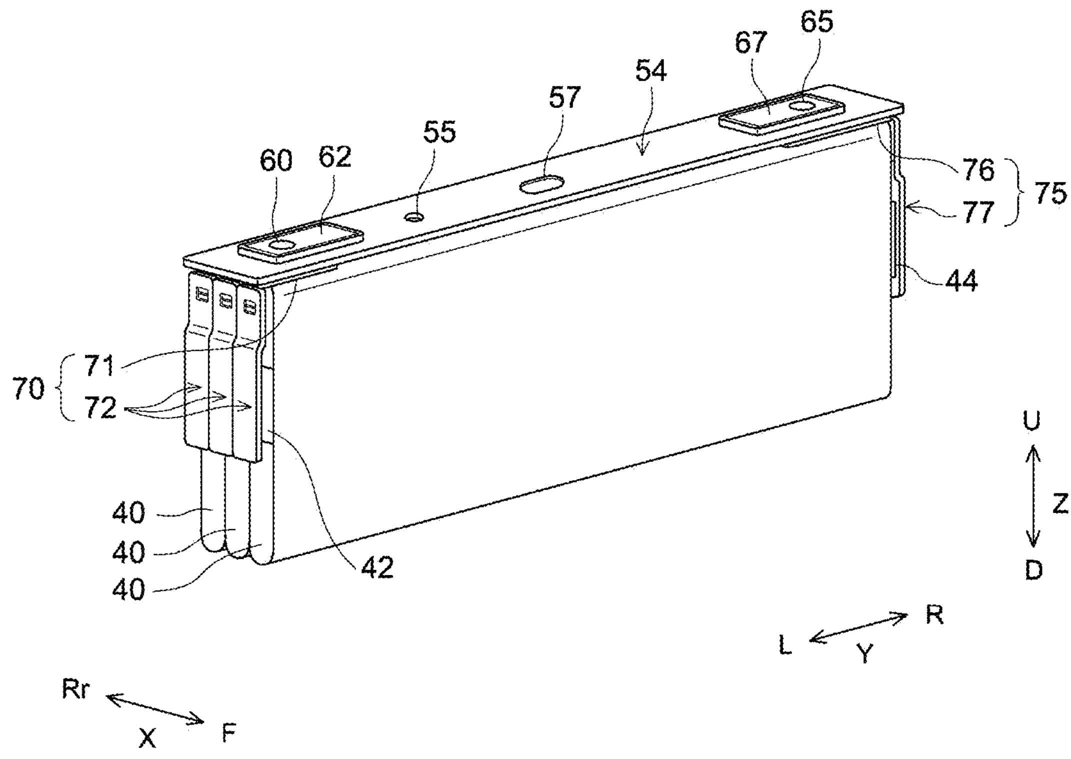
FIG. 10 is a perspective view that schematically shows an electrode body attached to a sealing plate.
Figure 11:
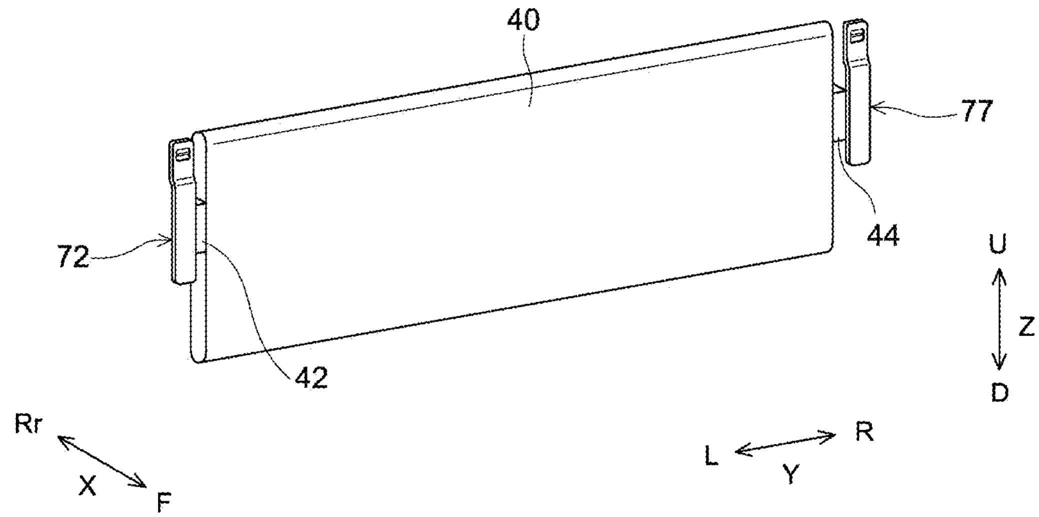
FIG. 11 is a perspective view that schematically shows the electrode body to which a positive electrode second electrical collector part and a negative electrode second electrical collector part are attached.
Figure 12:
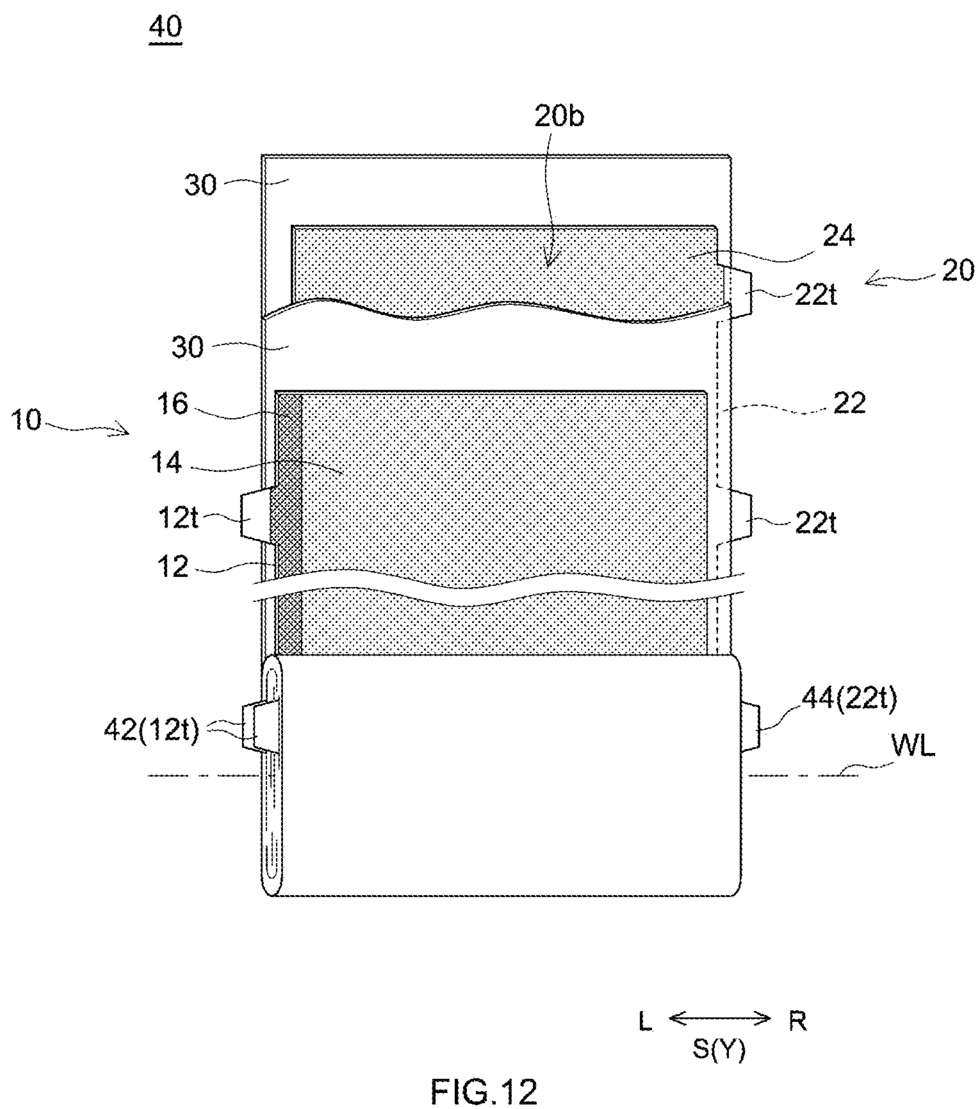
FIG. 12 is a perspective view that is for explaining the electrode body of a secondary battery in accordance with one embodiment.
Figure 13:
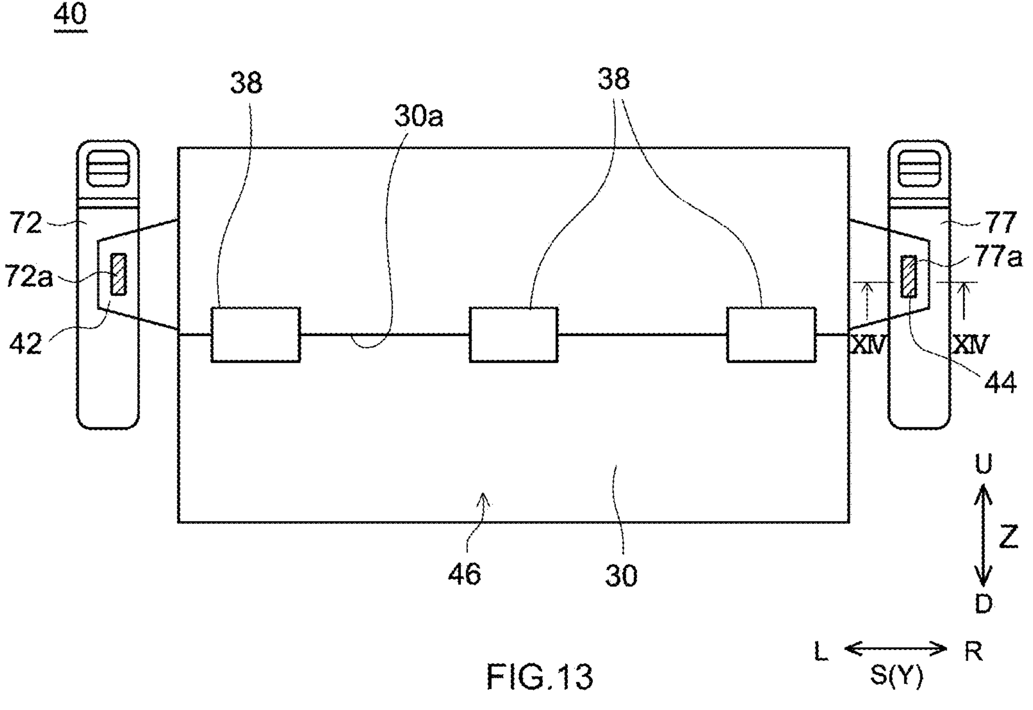
FIG. 13 is a front view that schematically shows the electrode body to which the positive electrode second electrical collector part and the negative electrode second electrical collector part are attached.
Figure 14:
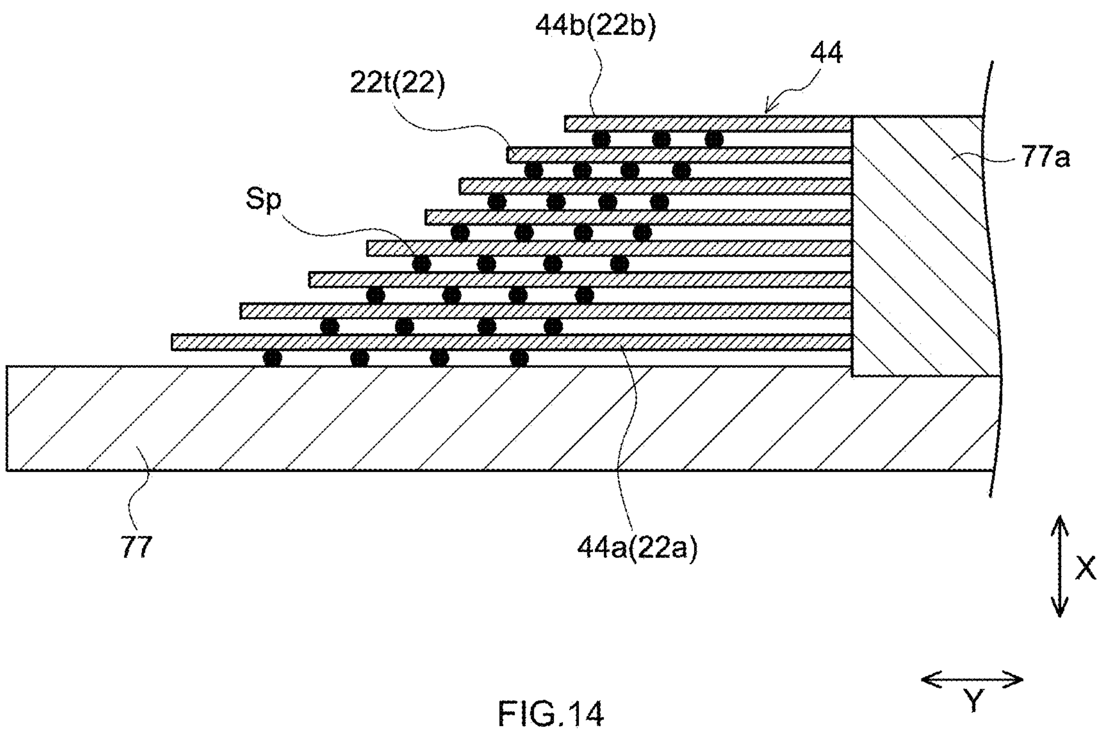
FIG. 14 is a XIV-XIV view-arrow cross section view of FIG. 13.

Next, the secondary battery manufactured with the negative electrode plate 20 in accordance with the present embodiment will be described. FIG. 6 is a perspective view that schematically shows a secondary battery in accordance with the present embodiment. FIG. 7 is a longitudinal cross section view that is schematically shown along a VII-VII line of FIG. 6. FIG. 8 is a longitudinal cross section view that is schematically shown along a VIII-VIII line of FIG. 6. FIG. 9 is a lateral cross section view that is schematically shown along a IX-IX line of FIG. 6. FIG. 10 is a perspective view that schematically shows an electrode body attached to a sealing plate. FIG. 11 is a perspective view that schematically shows the electrode body to which a positive electrode second electrical collector part and a negative electrode second electrical collector part are attached. FIG. 12 is a perspective view that is for explaining the electrode body of the secondary battery in accordance with the present embodiment. FIG. 13 is a front view that schematically shows the electrode body to which the positive electrode second electrical collector part and the negative electrode second electrical collector part are attached. FIG. 14 is a XIV-XIV view-arrow cross section view of FIG. 13. Incidentally, a reference sign X in FIGS. 6 to 14 represent "thickness direction" of the secondary battery 100, a reference sign Y represents "width direction", and a reference sign Z represents "vertical direction". Additionally, in a thickness direction X, F represents the "front" and Rr represents the "rear". In a width direction Y, L represents the "left" and R represents the "right". Then, in a vertical direction Z, U represents "up" and D represents "down". However, these directions are defined for convenience sake of explanation, and it is not intended that these directions restrict the disposed form of the secondary battery 100.

As shown in FIGS. 6 to 9, the secondary battery 100 in accordance with the present embodiment includes an electrode body 40, a battery case 50, a positive electrode terminal 60, a negative electrode terminal 65, a positive electrode collecting member 70, and a negative electrode collecting member 75. In addition, as the illustration is omitted, a nonaqueous electrolyte in addition to the electrode body 40 is also accommodated inside the battery case 50 of the secondary battery 100. This nonaqueous electrolyte is prepared by dissolving the supporting salt into the nonaqueous type solvent. As one example of the nonaqueous type solvent, it is possible to use a carbonate type solvent, such as ethylene carbonate, dimethyl carbonate, and ethyl methyl carbonate. As one example of the supporting salt, it is possible to use fluorine-containing lithium salt, such as $LiPF_6$.

(1) Battery Case

The battery case 50 is a housing configured to accommodate the electrode body 40. The battery case 50 in the present embodiment has an outer shape being a flat and bottomed rectangular parallelopiped shape (square shape). A material of the battery case 50 might be the same as a material conventionally used, and is not particularly restricted. It is preferable that the battery case 50 is made of metal, and it is further preferable that the battery case is made from, for example, aluminum, aluminum alloy, iron, iron alloy, or the like. The battery case 50 includes an outer package 52 and a sealing plate 54.

The outer package 52 is a container formed in a flat bottomed square shape whose upper surface includes an opening 52*h*. As shown in FIG. 6, the outer package 52 includes a bottom wall 52*a* formed in a flat surface approximately rectangular shape, a pair of longer side walls 52*b* extending from long sides of the bottom wall 52*a* in the vertical direction Z, and a pair of shorter side walls 52*c* extending from short sides of the bottom wall 52*a* in the vertical direction Z. On the other hand, the sealing plate 54 is a plate-shaped member formed in a flat surface approximately rectangular shape that is configured to cover the opening 52*h* of the outer package 52. Then, an outer circumferential edge part of the sealing plate 54 is joined (e.g., welded) to an outer circumferential edge part of the opening 52*h* of the outer package 52. By doing this, the battery case 50 whose inside is airtightly sealed (hermetically sealed) is manufactured. In addition, the sealing plate 54 is provided with a liquid injection hole 55 and a gas exhaust valve 57. The liquid injection hole 55 is provided inside the battery case 50 already joined with the outer package 52 and the sealing plate 54, in order to perform liquid injection of the nonaqueous electrolyte. Incidentally, regarding the secondary battery 100 after the liquid injection of the nonaqueous electrolyte, the liquid injection hole 55 is sealed with a sealing member 56. In addition, the gas exhaust valve 57 is a thin-walled part that is designed to be broken (opened) by a predetermined pressure when a large amount of gas is generated in the battery case 50 so as to exhaust the gas inside the battery case 50.

(2) Electrode Terminal

In addition, at one (left side in FIG. 6 and FIG. 7) of end parts of the sealing plate 54 in the long side direction Y of the secondary battery 100, the positive electrode terminal 60 is attached. The positive electrode terminal 60 as described above is connected to a plate-shaped positive electrode outside conductive member 62 at an outside of the battery case 50. On the other hand, at the other one (right side in FIG. 6 and FIG. 7) of the end parts of the sealing plate 54 in the long side direction Y of the secondary battery 100, a negative electrode terminal 65 is attached. A plate-shaped negative electrode outside conductive member 67 is attached to the negative electrode terminal 65 as described above, too. These outside conductive members (positive electrode outside conductive member 62 and negative electrode outside conductive member 67) are connected via an outside connecting member (bus bar, or the like) to another secondary battery or an outside equipment. Incidentally, it is preferable that the outside conductive member is configured with a metal having an outstanding electrically conductive property (aluminum, aluminum alloy, copper, copper alloy, or the like).

(3) Electrode Collecting Member

Regarding the secondary battery 100, a plurality of (3 pieces in the figure) the electrode bodies 40 are accommodated inside the battery case 50. The positive electrode terminal 60 is connected to each of electrode bodies 40 via the positive electrode collecting member 70 accommodated inside the battery case 50. Particularly, inside the battery case 50, the positive electrode collecting member 70 configured to connect the positive electrode terminal 60 and the electrode body 40 is accommodated. As shown in FIG. 7, the positive electrode collecting member 70 includes a positive electrode first electrical collector part 71 and a plurality of positive electrode second electrical collector parts 72. The positive electrode first electrical collector part 71 is a plate-shaped conductive member extending along an inside surface of the sealing plate 54. The positive electrode second electrical collector parts 72 are plate-shaped conductive members extending along the vertical direction Z. Then, a lower end part 60*c* of the positive electrode terminal 60 extends toward an inside of the battery case 50 through a terminal insert hole 58 of the sealing plate 54 and is connected to the positive electrode first electrical collector part 71 (see FIG. 7). On the other hand, the positive electrode second electrical collector part 72 is connected to a positive electrode tab group 42 of the electrode body 40. For this connection of the positive electrode second electrical collector part 72 and the positive electrode tab group 42, it is possible to use ultrasonic joining, resistance welding, laser welding, or the like. Then, a first join part 72*a* is formed at this connecting portion (see FIG. 13). Incidentally, in consideration of a joining property with the positive electrode tab group 42, it is preferable that the positive electrode second electrical collector part 72 is made from a material (for example, aluminum, aluminum alloy, or the like) the same as the positive electrode core body 12. Then, as shown in FIG. 9, the positive electrode tab group 42 of the electrode body 40 is folded and bent to make the positive electrode second electrical collector part 72 and one side surface 40*a* of the electrode body 40 be opposed to each other. By doing this, a top end part of the positive electrode second electrical collector part 72 and the positive electrode first electrical collector part 71 are electrically connected.

On the other hand, the negative electrode terminal 65 is connected to each of electrode bodies 40 via the negative electrode collecting member 75 accommodated inside the battery case 50. The connection structure at the negative electrode side is approximately the same as the above-described connection structure at the positive electrode side. In particular, the negative electrode collecting member 75 includes a negative electrode first electrical collector part 76 and a plurality of negative electrode second electrical collector parts 77. The negative electrode collecting member 75 is a plate-shaped conductive member extending along an inside surface of the sealing plate 54. And, the negative electrode second electrical collector parts 77 are plate-shaped conductive members extending along the vertical direction Z. Then, a lower end part 65*c* of the negative electrode terminal 65 extends to an inside of the battery case 50 through a terminal insert hole 59 and is connected to the negative electrode first electrical collector part 76 (see FIG. 7). In addition, the negative electrode second electrical collector part 77 is connected to a negative electrode tab group 44 of the electrode body 40. It is possible to use ultrasonic joining, resistance welding, laser welding, or the like, for this connection of the negative electrode second electrical collector part 77 and the negative electrode tab group 44, too. Then, a second join part 77*a* is formed at the connecting portion of the negative electrode second electrical collector part 77 and the negative electrode tab group 44 (see FIG. 13). Incidentally, in consideration of a joining property with the negative electrode tab group 44, it is preferable that the negative electrode second electrical collector part 77 is made from a material (for example, copper, copper alloy, or the like) the same as the negative electrode core body 22. Then, the negative electrode tab group 44 is folded and bent to make the negative electrode second electrical collector part 77 and the other side surface 40*b* of the electrode body 40 be opposed to each other (see FIG. 9). By doing this, a top end part of the negative electrode second electrical collector part 77 and the negative electrode first electrical collector part 76 are electrically connected.

(4) Insulating Member

Additionally, regarding the secondary battery 100 in accordance with the present embodiment, various insulating members are attached to inhibit the conduction between the electrode body 40 and the battery case 50. In particular, an outside insulating member 92 is disposed between the positive electrode outside conductive member 62 (negative electrode outside conductive member 67) and an outside surface of the sealing plate 54 (see FIG. 6). By doing this, it is possible to inhibit the positive electrode outside conductive member 62 and the negative electrode outside conductive member 67 from conducting with the sealing plate 54. In addition, a gasket 90 is attached to each of the terminal insert holes 58, 59 of the sealing plate 54 (see FIG. 7). By doing this, it is possible to inhibit the positive electrode terminal 60 (or, negative electrode terminal 65) inserted into the terminal insert hole 58, 59 from conducting with the sealing plate 54. In addition, an inside insulating member 94 is arranged between the positive electrode first electrical collector part 71 (or negative electrode first electrical collector part 76) and an inside surface of the sealing plate 54. This inside insulating member 94 includes a plate-shaped base part 94*a* disposed between the positive electrode first electrical collector part 71 (or negative electrode first electrical collector part 76) and the inside surface of the sealing plate 54. By doing this, it is possible to inhibit the positive electrode first electrical collector part 71 and the negative electrode first electrical collector part 76 from conducting with the sealing plate 54. Furthermore, the inside insulating member 94 includes a protruding part 94*b* that protrudes from the inside surface of the sealing plate 54 toward the electrode body 40. By doing this, movement of the electrode body 40 in the vertical direction Z is regulated. As this result, it is possible to inhibit the electrode body 40 and the sealing plate 54 from directly bringing into contact with each other. Further, the electrode body 40 is accommodated inside the battery case 50 in a state of being covered by an electrode body holder 98 (see FIG. 8) that consists of a resin sheet having an insulating property. By doing this, it is possible to inhibit the electrode body 40 and the outer package 52 from directly bringing into contact with each other. Incidentally, a material of each insulating member described above is not particularly restricted, if having a predetermined insulating property. As one example, it is possible to use a synthetic resin material such as polyolefin type resin (example: polypropylene (PP), polyethylene (PE)), fluorine type resin (example: perfluoro alkoxy alkane (PFA), polytetrafluoroethylene (PTFE)), or the like.

(5) Electrode Body

The electrode body includes the positive electrode plate 10 and the negative electrode plate 20. As shown in FIG. 12, the electrode body 40 in the present embodiment is a wound electrode body. In this kind of wound electrode body, a pair of electrode plates (positive electrode plate 10, and negative electrode plate 20) are wound therein in a state of being opposed via the separator 30. For manufacturing this electrode body 40, at first, a laminate body is formed in which the positive electrode plate 10 formed in a long strip-like shape and the negative electrode plate 20 formed in a long strip-like shape are laminated with the long strip-like shaped separator 30 being disposed between the positive electrode plate and the negative electrode plate. Then, after this laminate body is wound along the longitudinal direction, a winding-stop tape 38 (see FIG. 13) is pasted to a terminal end part 30*a* of the separator 30 arranged at an outermost circumference. Below, each of members configuring the electrode body 40 will be described.

(a) Separator

At first, the separator 30 is a sheet-shaped member that is configured to inhibit the positive electrode plate 10 and the negative electrode plate 20 from bringing into contact with each other and that is configured to have a function of passing the charge carrier through the separator. As one example for the separator 30, it is possible to use a resin sheet provided with many fine holes that can pass the charge carriers through. It is preferable that the resin sheet as described above contains a resin layer consisting of polyolefin resin (for example, polyethylene (PE), or polypropylene (PP)). In addition, on a surface of the above-described resin sheet, a heat resistant layer might be formed which contains an inorganic filler, such as alumina, boehmite, water oxidation aluminum, and titania.

(b) Positive Electrode Plate

The positive electrode plate 10 includes the positive electrode core body 12 being a foil-shaped metal member, the positive electrode active material layer 14 provided on a surface of the positive electrode core body 12, and a protective layer 16 provided on the surface of the positive electrode core body 12 to be adjacent to a side edge part 10*a* of the positive electrode plate 10. For the positive electrode core body 12, a metal material having a predetermined electrically conductive property is used. For the positive electrode core body 12 as described above, it is possible, for example, to use aluminum, aluminum alloy, stainless steel, or the like. In addition, at the side edge part 10*a* of the positive electrode plate 10, a plurality of positive electrode tabs 12*t* are formed that protrudes toward an outside (left side in FIG. 12) in the shorter direction S. These positive electrode tabs 12*t* are provided to be spaced away from each other by a predetermined interval in the longitudinal direction L of the positive electrode plate 10. This positive electrode tab 12*t* is an area where the positive electrode active material layer 14 and the protective layer 16 are failed to be provided and the positive electrode core body 12 is exposed. Then, in the electrode body 40 having already been wound, the positive electrode tab group 42 is formed in which a plurality of the positive electrode tabs 12*t* are laminated. As described above, this positive electrode tab group 42 is connected to the positive electrode second electrical collector part 72 (see FIG. 13). Incidentally, from a perspective of a battery performance, it is preferable that the positive electrode active material layer 14 and the protective layer 16 are provided on both surfaces of the positive electrode core body 12. In addition, the protective layer 16 might be provided to have a part of the protective layer cover a side edge part of the positive electrode active material layer 14. Incidentally, for materials of the positive electrode active material layer 14 and protective layer 16, it is possible to use conventionally known materials capable of being used in a general secondary battery (for example, lithium ion secondary battery) without particular restriction, the materials do not restrict the herein disclosed technique, and thus the detailed explanation is omitted.

(c) Negative Electrode Plate

On the other hand, in this secondary battery 100, the negative electrode plate 20 in accordance with the present embodiment is used. As described above, when the negative electrode core body exposed area A2 (negative electrode core body 22) of the negative electrode precursor 20A is cut, the manufacturing method of the electrode plate in accordance with the present embodiment treats the second surface 22*b*, whose surface roughness is relatively smaller, as the laser non-irradiated surface, and treats the first surface 22*a*, whose surface roughness is relatively larger, as the laser irradiated surface. Thus, on the negative electrode plate 20 after the manufacture, the sticking amount of the sputters at the negative electrode tab 22*t* is decreased. By using this kind of negative electrode plate 20, it is possible to inhibit the sputter from unsticking from the negative electrode tab 22*t* inside the secondary battery 100 and thus possible to inhibit a microscopic inside short circuit.

By winding the laminate body configured as described above to include the positive electrode plate 10, the negative electrode plate 20, and the separator 30, the electrode body 40 is formed that includes a core part 46 in which the positive electrode active material layer 14 and the negative electrode active material layer 24 are opposed via the separator 30 (see FIG. 13). Then, as shown in FIG. 12 and FIG. 13, regarding the electrode body 40 after being wound, the negative electrode tab group 44 is formed on which a plurality of the negative electrode tabs 22*t* are laminated. In the present embodiment, the interval of the negative electrode tabs 22*t* in the longitudinal direction L of the negative electrode plate 20 is set to make one negative electrode tab 22*t* be laminated at each time when the negative electrode plate 20 is wound once. As this result, while shown in FIG. 14, regarding the electrode body 40 after being wound, the first surface 22*a* of the negative electrode tab 22*t* (negative electrode core body 22) is arranged on one surface 44*a* of the negative electrode tab group 44, and the second surface 22*b* of the negative electrode tab 22*t* (negative electrode core body 22) is arranged on the other surface 44*b*. In a situation where this kind of negative electrode tab 22*t* is formed, it is preferable that the negative electrode second electrical collector part 77 is connected to the surface 44*a* on which the first surface 22*a* of the negative electrode core body 22 is arranged, and that the second surface 22*b* of the negative electrode core body 22 (negative electrode tab 22*t*) is arranged on the other surface 44*b* to which the negative electrode second electrical collector part 77 is not connected. By doing this, it is possible to seal the first surface 22*a* between the negative electrode tab 22*t* and the negative electrode second electrical collector part 77 (or, between a plurality of the negative electrode tabs 22*t*), as the sticking amount of sputters on the first surface is larger. As this result, it is possible to suitably suppress the sputters from unsticking from the negative electrode plate 20. Incidentally, the arrangement position of the first surface 22*a* of the negative electrode tab 22*t* on the negative electrode tab group 44 does not restrict the herein disclosed technique. According to the herein disclosed technique, it is possible to decrease the total amount of sputters sticking to the negative electrode tab 22*t*. Thus, even when the first surface 22*a* is arranged on the other surface 44*b* to which the negative electrode second electrical collector part 77 is not connected, it is possible to decrease the amount of sputters unsticking from the negative electrode tab 22*t*, in comparison with the conventional technique.

4. Another Embodiment

Above, one embodiment of the herein disclosed technique is explained. Incidentally, the above described embodiment is an example to which the herein disclosed technique is applied. In other words, the above described embodiment does not restrict the herein disclosed technique.

For example, in the above described embodiment, the target for the herein disclosed technique is to be the negative electrode plate. However, the target for the herein disclosed technique is not restricted to the negative electrode plate, and thus, the positive electrode plate might be the target for the herein disclosed technique. Even in the situation where the manufacture target is the positive electrode plate, it is possible to decrease the sticking number of sputters sticking to the electrode plate (positive electrode plate) after the manufacture.

Figure 15:
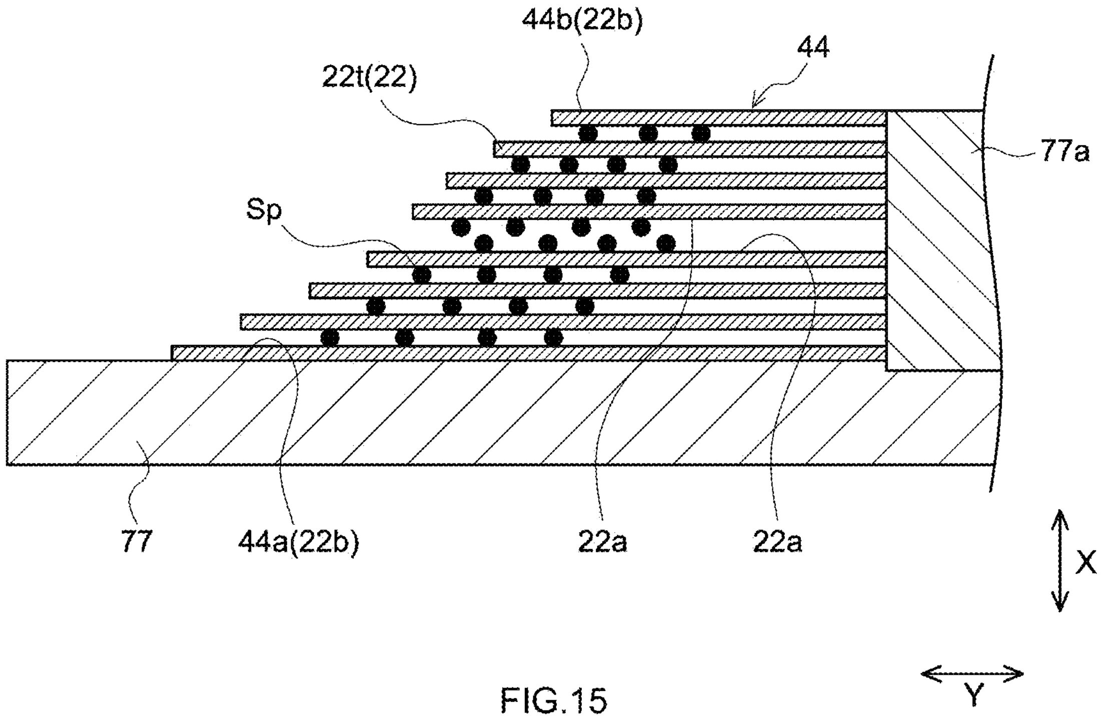
FIG. 15 is a cross section view that schematically shows a connecting portion with an electrical collector part and the electrode body of the secondary battery in accordance with another embodiment.

In addition, the structure of the electrode body is not an element restricting the herein disclosed technique, either. For example, the electrode body 40 of the above described embodiment is applied with a configuration in which one negative electrode tab 22*t* is laminated at each time when the negative electrode plate 20 is wound once. However, the configuration of the electrode body is not particularly restricted, and a configuration can be applied in which two negative electrode tabs are laminated at each time when the negative electrode plate is wound once. As shown in FIG. 15, in that situation, it is preferable that a wound direction of the negative electrode plate 20 is adjusted to make the first surface 22*a* of the negative electrode tab 22*t* (negative electrode core body 22) be arranged at an inside in the width direction Y. By doing this, it is possible to seal the first surface 22*a* between the negative electrode tabs 22*t*, as the sticking amount of sputters on the first surface is larger.

Additionally, in the above described embodiment, the wound electrode body is used as the electrode body. However, it is sufficient for the electrode body to include the positive electrode plate and the negative electrode plate, and the electrode body is not restricted to the wound electrode body. As for another example structure of the electrode body, it is possible to use a laminate electrode body on which a plurality of the positive electrode plates and a plurality of the negative electrode plates are sequentially laminated via separators. For manufacturing this kind of negative electrode plate designed for the laminate electrode body, it is preferable that cutting along the shorter direction S as shown by the two-dot chain line LN4 in FIG. 3 is performed by each one negative electrode tab 22*t*. Although detailed explanation is omitted, it is similar for manufacturing the positive electrode plate, too. Then, to laminate positive electrode tabs at the same position and to laminate the negative electrode tabs of the negative electrode plate at the same position, a plurality of the positive electrode plates and a plurality of the negative electrode plates are sequentially laminated via separators. By doing this, it is possible to manufacture the laminate electrode body.

Additionally, in the above described embodiment, the secondary battery 100 is targeted that has a high capacity and has accommodated three electrode bodies 40 inside the battery case 50. However, the number of the electrode bodies accommodated in one battery case is not particularly restricted, and might be equal to or more than 2 (plural) or might be 1. Furthermore, the secondary battery 100 in accordance with the above described embodiment is a lithium ion secondary battery whose charge carrier is lithium ion. However, the secondary battery disclosed herein is not restricted to the lithium ion secondary battery. Even a manufacturing step for another secondary battery (for example, nickel hydrogen battery, or the like) includes a step for using a laser to cut the active material provided area and the core body exposed area of the electrode precursor, and thus it is possible to apply the herein disclosed technique without particular restriction.

In addition, the secondary battery 100 in accordance with the above described embodiment is a nonaqueous electrolyte secondary battery using a nonaqueous electrolyte as the electrolyte. However, the herein disclosed technique can be applied to a battery other than the nonaqueous electrolyte secondary battery. As for another example structure of the secondary battery, it is possible to use an all-solid battery. In this all-solid battery, a solid electrolyte layer on which a solid electrolyte is molded in a sheet shape is used as the separator disposed between the positive electrode plate and the negative electrode plate. In this all-solid battery, the separator and the electrolyte are integrated and contained inside the electrode body, and thus it is possible to inhibit leakage of the electrolyte. Even a manufacturing step for this kind of all-solid battery includes a step for using a laser to cut the core body exposed area of the electrode precursor, and thus the herein disclosed technique can be applied without particular restriction.

Test Example

Below, a test example related to the present disclosure is explained. Incidentally, contents of the test example described below are not intended to restrict the present disclosure.

1. Sample Preparation

Example 1

Regarding an example 1, by performing laser cut on the negative electrode active material provided area of the negative electrode precursor and the core body exposed area, the negative electrode designed for the lithium ion secondary battery was manufactured. At first, a negative electrode precursor was prepared in which a negative electrode active material layer whose thickness was 80 μm was provided on both surfaces of a negative electrode core body (copper foil) whose thickness was 8 μm. This negative electrode active material layer of the negative electrode precursor contains a negative electrode active material, a thickening agent, and a binder whose rate is 98.3:0.7:1.0. Incidentally, a graphite (graphite) was used as for the negative electrode active material, carboxymethyl cellulose (CMC) was used as for the thickening agent, and styrene butadiene rubber (SBR) was used as for the binder. Then, the negative electrode plate was cut out from the negative electrode precursor at a predetermined condition. In particular, regarding the example 1, a pulse laser was used while a pulse width was set to be 120 ns, a power was set to be 35%, an output was set to be 105 W, and a frequency was set to be 300 kHz. Then, regarding the example 1, the negative electrode plate was cut out, while the surface whose surface roughness was relatively smaller was treated as the laser non-irradiated surface and the surface whose surface roughness was relatively larger was treated as the laser irradiated surface.

Comparative Example 1

Regarding a comparative example 1, the negative electrode plate was manufactured under a condition the same as the example 1, except for a point that a surface whose surface roughness was relatively smaller was treated as the laser irradiated surface when the negative electrode plate was cut out from the negative electrode precursor.

Example 2 and Comparative Example 2

Regarding an example 2, the negative electrode plate was cut out under a condition the same as the example 1, except for setting the pulse width of the pulse laser to be 120 ns, setting the power to be 95%, setting the output to be 285 W, and setting the frequency to be 300 KHz.

In addition, regarding a comparative example 2, the negative electrode plate was manufactured under a condition the same as the example 2, except for treating the surface, whose surface roughness is relatively smaller, as the laser irradiated surface.

Example 3 and Comparative Example 3

Regarding an example 3, the negative electrode plate was cut out under a condition the same as the example 1, except for setting the pulse width of the pulse laser to be 120 ns, setting the power to be 95%, setting the output to be 95 W, and setting the frequency to be 100 kHz. In addition, regarding a comparative example 3, the negative electrode plate was manufactured under a condition the same as the example 3, except for treating the surface, whose surface roughness is relatively smaller, as the laser irradiated surface.

Example 4 and Comparative Example 4

Regarding a example 4, the negative electrode plate was cut out under a condition the same as the example 1, except for setting the pulse width of the pulse laser to be 60 ns, setting the power to be 35%, setting the output to be 105 W, and setting the frequency to be 750 kHz. In addition, regarding a comparative example 4, the negative electrode plate was manufactured under a condition the same as the example 4, except for treating the surface, whose surface roughness is relatively smaller, as the laser irradiated surface.

Example 5 and Comparative Example 5

Regarding an example 5, the negative electrode plate was cut out under a condition the same as the example 1, except for setting the pulse width of the pulse laser to be 60 ns, setting the power to be 95%, setting the output to be 114 W, and setting the frequency to be 300 kHz. In addition, regarding a comparative example 5, the negative electrode plate was manufactured under a condition the same as the example 5, except for treating the surface, whose surface roughness is relatively smaller, as the laser irradiated surface.

2. Evaluation Test (1) Surface Roughness Measurement

In the present test, the surface roughness of the laser irradiated surface on the core body exposed area (exposed negative electrode core body) and the surface roughness of a surface at a side opposite to the laser irradiated surface were measured before cutting out the negative electrode plate by laser cut was performed. Particularly, in accordance with ISO25178, the maximum heights Sz and average roughnesses Sa of both surfaces of the negative electrode core body were measured. Measurement results are shown in Table 1.

(2) Sputter Sticking Number Measurement

In the present test, the sticking number of sputters on the negative electrode tab of the negative electrode plate after the laser cut was measured. In particular, by pasting an adhesive tape to each of an upper surface and a lower surface of the negative electrode tab and then by peeling off the adhesive tape, the sputters sticking on the negative electrode tab were collected. At that time, the adhesive tape pasted area size was set to be 3.7 $cm^2$ on each surface. Then, by observing this adhesive tape with a microscope while pasting a base sheet, the sputter sticking numbers of the laser irradiated surface and the laser non-irradiated surface for the negative electrode tab of each example were measured. Incidentally, measuring the sputter sticking number was implemented by an image analysis performed on a microscope picture for the adhesive tape captured with an optical microscope (made by KEYENCE corporation, model: VHX-6000), and then by counting the number of metal particles whose sizes were equal to or more than 5 μm. Detailed conditions for capturing pictures and analyzing images are described below. In addition, the measurement results are shown in Table 1. Incidentally, the sputter sticking number in Table 1 means a number per an unit area (pieces/$cm^2$).

[Capture Condition]

Magnification: 200 times
Capture mode: Image connection
Image color adjustment: R=1.65, G=1.00, B=2.22
Ring lighting: 180 (1160 lux) stage-lighting distance 67 mm
Shutter speed: 33.00 ms

[Analysis Condition (Automatic Area Measurement)]

Hue: 0 to 45, and 240 to 255
Saturation: 35 to 255
Separation degree: 100

TABLE 1

| | Surface roughness | | | | Laser irradiation condition | | | | Sputter sticking number | | |
|---|---|---|---|---|---|---|---|---|---|---|---|
| | Upper surface (laser irradiated surface) | | Lower surface | | Pulse width | Power | Output | Frequency | Upper surface | Lower surface | Total (pieces/ |
| | Sz (μm) | Sa (μm) | Sz (μm) | Sa (μm) | (ns) | (%) | (W) | (kHz) | (pieces/$cm^2$) | (pieces/$cm^2$) | $cm^2$) |
| Example 1 | 1.76 | 0.16 | 0.99 | 0.097 | 120 | 35 | 105 | 300 | 60 | 24 | 84 |
| Comparative example 1 | 0.88 | 0.087 | 1.77 | 0.159 | 120 | 35 | 105 | 300 | 68 | 66 | 134 |
| Example 2 | 1.59 | 0.166 | 0.74 | 0.085 | 120 | 95 | 285 | 300 | 49 | 8 | 57 |
| Comparative example 2 | 1.02 | 0.097 | 1.6 | 0.15 | 120 | 95 | 285 | 300 | 53 | 63 | 116 |
| Example 3 | 1.62 | 0.181 | 0.96 | 0.099 | 120 | 95 | 95 | 100 | 80 | 37 | 117 |
| Comparative example 3 | 0.85 | 0.091 | 1.41 | 0.161 | 120 | 95 | 95 | 100 | 148 | 48 | 196 |

TABLE 1-continued

| | Surface roughness | | | | Laser irradiation condition | | | | Sputter sticking number | | |
|---|---|---|---|---|---|---|---|---|---|---|---|
| | Upper surface (laser irradiated surface) | | Lower surface | | Pulse width | Power | Output | Fre-quency | Upper surface | Lower surface | Total (pieces/ |
| | Sz (μm) | Sa (μm) | Sz (μm) | Sa (μm) | (ns) | (%) | (W) | (kHz) | (pieces/cm$^2$) | (pieces/cm$^2$) | cm$^2$) |
| Example 4 | 1.6 | 0.162 | 1.19 | 0.116 | 60 | 35 | 105 | 750 | 59 | 28 | 87 |
| Comparative example 4 | 1.05 | 0.099 | 1.5 | 0.17 | 60 | 35 | 105 | 750 | 43 | 53 | 96 |
| Example 5 | 1.62 | 0.147 | 1.14 | 0.119 | 60 | 95 | 114 | 300 | 55 | 2 | 57 |
| Comparative example 5 | 1.24 | 0.098 | 1.42 | 0.162 | 60 | 95 | 114 | 300 | 32 | 82 | 114 |

As shown in Table 1, when the example 1 and the comparative example 1 were compared, the sticking number of sputters on the negative electrode tab was decreased in the example 1. Then, the sticking number of the sputters on the laser irradiated surface and the sticking number of the sputters on the laser non-irradiated surface were confirmed, the sticking number of sputters on the laser non-irradiated surface of the example 1, in which the surface having a smaller surface roughness was treated as the laser non-irradiated surface, was particularly and remarkably decreased in comparison with the comparative example 1. Additionally, even in comparison with the examples 2 to 5 and the comparative examples 2 to 6, similar tendencies were confirmed. From these confirmations, it was found that the sticking number of sputters on the electrode plate after the manufacture could be decreased by treating the surface having the smaller surface roughness as the laser non-irradiated surface and by treating the surface having the larger surface roughness as the laser irradiated surface.

Although the present disclosure is explained above in details, the above described explanation is merely an illustration. In other words, the herein disclosed technique contains ones in which the above described specific examples are deformed or changed.

What is claimed is:

1. A method for manufacturing an electrode plate comprising an electrode core body being a metal foil and an electrode active material layer provided on a surface of the electrode core body, the method comprising:

a precursor preparation step for preparing an electrode precursor comprising an active material provided area on the surface of the electrode core body, and a core body exposed area; and a core body exposed area cutting step for cutting off the core body exposed area with a laser so as to form an electrode tab, wherein the electrode core body comprises a first surface, and a second surface disposed at an opposite side of the first surface, a surface roughness of the second surface is smaller than a surface roughness of the first surface, wherein the surface roughness of the second surface measured in accordance with ISO 25178 is 0.14 μm or less, and the surface roughness of the first surface measured in accordance with ISO 25178 is 0.25 μm or less, and in the core body exposed area cutting step, the laser is irradiated to the first surface.

2. The method for manufacturing the electrode plate according to claim 1, wherein the laser is a pulse laser.

3. The method for manufacturing the electrode plate according to claim 2, wherein a frequency of the pulse laser is 50 kHz or more and 1000 kHz or less, an average output of the pulse laser is 50 W or more and 500 W or less, a pulse width of the pulse laser is 30 ns or more and 300 ns or less, a spot diameter of the pulse laser is 10 μm to 60 μm, and a scanning speed of the pulse laser is 20 mm/sec or more and 5000 mm/sec or less.

4. The method for manufacturing the electrode plate according to claim 1, wherein the electrode core body contains copper or a copper alloy.

5. The method for manufacturing the electrode plate according to claim 1, wherein the roughness of the second surface measured in accordance with ISO 25178 is equal to or more than 0.07 μm.

6. The method for manufacturing the electrode plate according to claim 1, wherein the roughness of the first surface measured in accordance with ISO 25178 is equal to or more than 0.1 μm.

7. The method for manufacturing the electrode plate according to claim 1, wherein the method further comprising an active material provided area cutting step for cutting the active material provided area with a laser, the electrode plate including a plurality of electrode tabs protrude from a side edge part of the active material provided area is manufactured by alternately performing the core body exposed area cutting step and the active material provided area cutting step.

8. A manufacturing method of a secondary battery comprising an electrode body including a positive electrode plate and a negative electrode plate, wherein the method for manufacturing the electrode plate according to claim 1 is used so as to manufacture at least one of the positive electrode plate and the negative electrode plate.

9. The manufacturing method of the secondary battery according to claim 8, wherein the method further comprising:

an electrode body manufacturing step for manufacturing an electrode body including an electrode tab group laminated a plurality of the electrode tabs; and an electrical collector member connecting step for connecting one of surface of the electrode tab group to an electrical collector member, wherein in the electrical collector member connecting step, the second surface of the electrode core body is arranged on another surface of the electrode tab group to which the electrical collector member is not connected.

10. The method for manufacturing the electrode plate according to claim 1, further includes a step for confirming the surface roughness of each of the first surface and the second surface of the electrode core body before the core body exposed area cutting step.

* * * * *